(12) United States Patent
Otten et al.

(10) Patent No.: US 12,479,316 B2
(45) Date of Patent: Nov. 25, 2025

(54) SCALABLE MULTI-PORT CONVERTER FOR SOLAR ELECTRIC VEHICLES

(71) Applicant: Lightyear IPCo B.V., Helmond (NL)

(72) Inventors: Marald Otten, Eindhoven (NL); Bastiaan Joannes Daniel Vermulst, Lieshout (NL); Bart Franciscus Joseph Bokmans, Eindhoven (NL)

(73) Assignee: Lightyear IPCo B.V., Helmond (NL)

( * ) Notice: Subject to any disclaimer, the term of this patent is extended or adjusted under 35 U.S.C. 154(b) by 31 days.

(21) Appl. No.: 18/571,662

(22) PCT Filed: Jun. 28, 2022

(86) PCT No.: PCT/EP2022/067665
§ 371 (c)(1),
(2) Date: Dec. 18, 2023

(87) PCT Pub. No.: WO2023/275011
PCT Pub. Date: Jan. 5, 2023

(65) Prior Publication Data
US 2024/0286494 A1 Aug. 29, 2024

(30) Foreign Application Priority Data
Jun. 29, 2021 (NL) .................................... 2028567

(51) Int. Cl.
*B60L 50/53* (2019.01)
*H02M 3/335* (2006.01)

(52) U.S. Cl.
CPC ......... *B60L 50/53* (2019.02); *H02M 3/33573* (2021.05); *H02M 3/33576* (2013.01); *B60L 2210/10* (2013.01)

(58) Field of Classification Search
CPC ............... B60L 50/53; B60L 2210/10; H02M 3/33573; H02M 3/33576
(Continued)

(56) References Cited

U.S. PATENT DOCUMENTS

| | | |
|---|---|---|
| 2016/0016479 A1 | 1/2016 | Khaligh et al. |
| 2020/0266717 A1 | 8/2020 | Murakami |

(Continued)

FOREIGN PATENT DOCUMENTS

WO 2019199964 A1 10/2019

OTHER PUBLICATIONS

Netherlands Search Report and Written Opinion dated Jan. 1, 2022, for Netherlands Patent Application No. 2028567.
(Continued)

*Primary Examiner* — Hal Kaplan
(74) *Attorney, Agent, or Firm* — Patterson + Sheridan, LLP

(57) ABSTRACT

This invention pertains to a three-port isolated active bridge DC-DC power converter comprising a control unit, a first primary-side port, a second primary-side port, two primary-side switching elements, a blocking switch, a secondary-side port and two secondary-side switching elements. The control unit is configured to open and to close the blocking switch, for preventing and allowing power flow between a primary side and a secondary side of the power converter. The control unit is configured to control the two primary-side switching elements and the two secondary-side switching elements for converting power between the primary-side ports and the secondary-side port. This invention further pertains to a three-port isolated active bridge DC-DC power converter system, a multi-port isolated active bridge DC-DC power converter, a multi-port isolated active bridge DC-DC power converter system, a solar power assembly, and a vehicle.

14 Claims, 8 Drawing Sheets

(58) Field of Classification Search
USPC .......................................................... 307/91
See application file for complete search history.

(56) References Cited

U.S. PATENT DOCUMENTS

2020/0398686 A1    12/2020  Tang et al.
2021/0367521 A1*   11/2021  Sakai ................ H02M 3/33584

OTHER PUBLICATIONS

PCT International Search Report and Written Opinion dated Aug. 12, 2022, for International Application No. PCT/EP2022/067665.

* cited by examiner

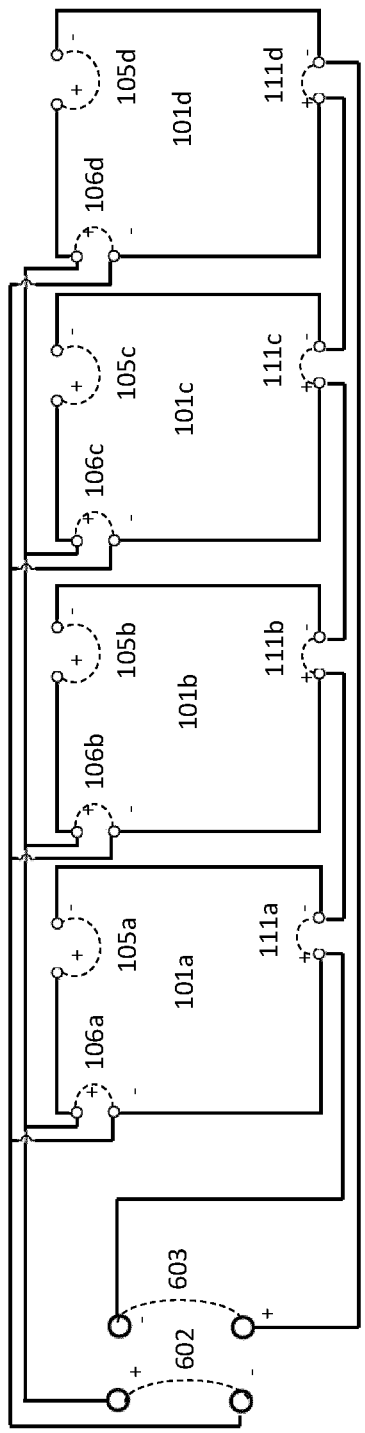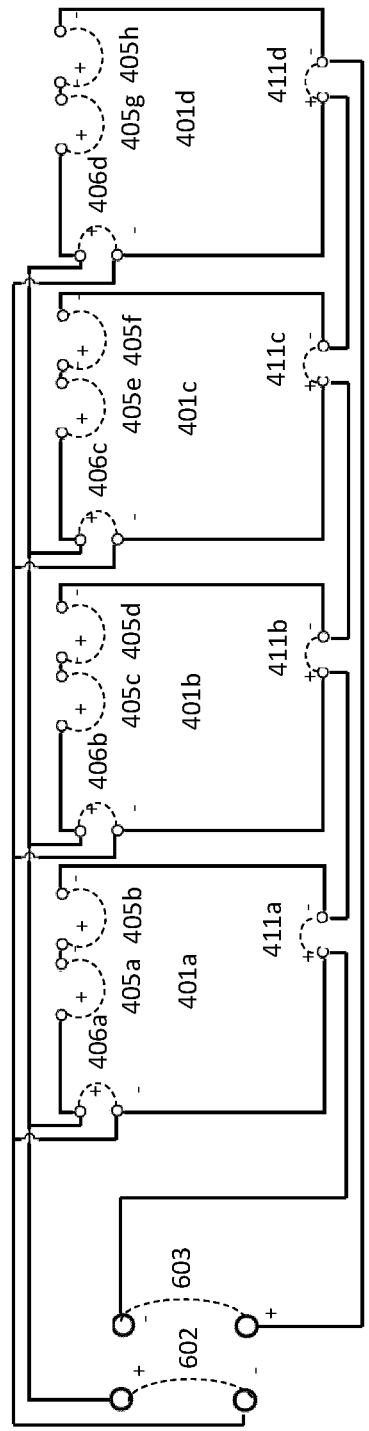
Fig. 6a
Fig. 6b

SCALABLE MULTI-PORT CONVERTER FOR SOLAR ELECTRIC VEHICLES

This invention pertains to a three-port isolated active bridge DC-DC power converter for converting power between an first primary-side port, a second primary-side port, and a secondary-side port. This invention further pertains to a three-port isolated active bridge DC-DC power converter system, comprising a plurality of three-port isolated active bridge DC-DC power converters. This invention further pertains to a multi-port isolated active bridge DC-DC power converter for converting power between a plurality of first primary-side ports, a second primary-side port, and a secondary-side port. This invention further pertains to a multi-port isolated active bridge DC-DC power converter system comprising a plurality of multi-port isolated active bridge DC-DC power converters. This invention further pertains to a solar power assembly, comprising a plurality of solar power generating units and a power converter system. This invention further pertains to a vehicle, comprising a solar power assembly.

BACKGROUND

Vehicles, in particular vehicles that are at least in part, optionally fully, powered by renewable energy, in particular vehicles that are powered by power generating units such as solar panels or fuel cells, typically require power converters for converting power between power generators, power consumers, and power storage. For example, a typical architecture for a solar-powered vehicle includes a low voltage bus and a high voltage bus. The low voltage bus powers the low voltage electrical components of the vehicle and typically includes a low voltage battery for storing power. The high voltage bus powers the high voltage electrical components and typically includes a high voltage battery for storing power, and typically has a higher capacity than the low voltage battery. In this example architecture, it is typically required for the power generated by the power generating units to be converted to the low voltage bus and the high voltage bus. Further, the power stored in the high voltage battery is converted in certain cases to the low voltage bus.

In the state of the art, often multiple power converters are used. For example, the power generating units are solar power generating units. In this example, the energy of the solar power generating units is supplied to either the low voltage battery or the high voltage battery with a maximum power point tracker. A separate isolated power converter is used to convert energy between the low voltage battery and the high voltage battery. Due to the curvature of the roof and shade casted on the solar power generating units, the solar power generating units in certain cases receive a different solar irradiance. The different solar irradiance received by the solar power generating units results in a different output current for each solar power generating unit. If the solar power generating units are connected in series to generate a suitable output voltage, the solar power generating unit with the lowest irradiance limits the maximum power point current. In certain solutions found in the state of the art, the limiting solar power generating unit is bypassed, resulting in all power of that solar power generating unit being lost. Other solutions include reducing the number of solar power generating units and using a high voltage gain maximum power point tracker or using a delta maximum power point tracker which redistributes power among the solar power generating units. However, such solutions are often proposed for systems in which the solar power generating units receive about the same solar irradiance. Other solutions are proposed in the state of the art wherein the solar power generating units have high voltage output, which poses a safety concern. In particular, in case the vehicle in which the solution is integrated is involved in a crash, the solar power generating units cannot be turned off, which means that any rescue personnel and/or the driver is potentially exposed to these high voltages.

Further, from the state of the art, multi-port power converters are known. In some of these solutions, multi-port power converters are described in which fully isolated power conversion is provided between multiple power sources and sinks. However, isolation between the solar power generating units is typically not required, which reduces the efficiency of these power converters. In other solutions, multiple power inputs are combined, wherein a single switch is provided per input. As a result, only one input, i.e., one solar power generating unit, can be active at the same time. In yet other solutions, multi-port power converters are presented with two non-isolated and one isolated power port. However, several issues remain in these architectures. First, the isolated port(s) of these architectures is/are unidirectional, preventing power to flow both in and out of the isolated ports. In these architectures, an additional power converter is added to enable power flow in both directions. Second, every additional input, i.e., every additional solar power generating unit, requires an additional set of switching elements in the power converter. Third, excessive losses are incurred due to the high voltage gain for converting power to the high voltage bus.

SUMMARY OF THE INVENTION

It is an objective of the invention to provide DC-DC power converters that improve upon the state of the art or to provide an alternative for the state of the art. It is further an objective of the invention to provide DC-DC power converter systems, wherein a DC-DC power converter system is a combination of multiple DC-DC power converters. The DC-DC power converter system provides for multiple first primary-side ports. It is further an objective of the invention to provide a solar power assembly, wherein a plurality of solar power generating units is connected to a power converter system. It is further an objective of the invention to provide a vehicle, wherein the vehicle comprises a solar power assembly for providing power to a low voltage battery and a high voltage battery.

According to a first aspect of the invention, the objective is achieved by a three-port isolated active bridge DC-DC power converter, comprising a control unit, a primary side, a secondary side, and a blocking switch.

The primary side comprises an first primary-side port, a second primary-side port, two primary-side switching elements, a primary-side converter inductance, and a primary-side transformer winding. The first primary-side port and the second primary-side port are distinct ports, i.e., there are at least two primary-side ports. In a preferential embodiment, the primary side comprises a single first primary-side port and a single second primary-side port, i.e., in this embodiment, the primary side comprises exactly two primary-side ports. The two primary-side switching elements and the primary-side converter inductance are arranged to form a half-bridge arrangement for bidirectionally converting power between the first primary-side port and the second primary-side port. The control unit is configured to control the two primary-side switching elements to convert power between the first primary-side port and the second primary-side port. The primary-side switching elements are, for example, JFETs, IGBTs, GaN HEMTs, or MOSFETs.

The primary-side circuit is arranged such that it forms a power converter between the first primary-side port and the second primary-side port. For example, in the case that the voltage is to be stepped down between the first primary-side port and the second primary-side port, the primary side forms a buck converter between the first primary-side port and the second primary-side port. For another example, in the case that the voltage is to be stepped up between the first primary-side port and the second primary-side port, the primary side forms a boost converter between the first primary-side port and the second primary-side port. To increase the efficiency of the power converter, the first primary-side port and the second primary-side port are connected without isolation.

The secondary side comprises a secondary-side port, two secondary-side switching elements, and a secondary-side transformer winding. In a preferential embodiment, the secondary side comprises a single secondary-side port and a single secondary-side transformer winding. The secondary-side transformer winding is magnetically coupled to the primary-side transformer winding. The two primary-side switching elements, the primary-side transformer winding, the two secondary-side switching elements, and the secondary-side transformer winding are arranged to form an isolated DC-DC converter between the primary side and the secondary side. In other words, the two primary-side switching elements, the primary-side transformer winding, the two secondary-side switching elements, and the secondary-side transformer winding are arranged to form an isolated DC-DC converter between the primary-side ports and the secondary-side port. The control unit is further configured to control the two primary-side switching elements and the two secondary-side switching elements for converting power between the primary-side ports and the secondary-side port. The secondary-side switching elements are, for example, JFETs, IGBTs, GaN HEMTs, or MOSFETs The first primary-side port, the second primary-side port, and the secondary-side port each comprise a pair of terminals, which terminals are for example used to connect to an external electrical circuit. For example, the second primary-side port is connected to a low voltage bus, which connects the three-port isolated active bridge DC-DC power converter to a low voltage battery. For example, the secondary-side port is connected to a high voltage bus, which connects the three-port isolated active bridge DC-DC power converter to a high voltage battery. For example, the first primary-side port is connected to a power generating unit. The power generating unit is for example a solar power generating unit, or a fuel cell, or a wind turbine. For example, the three-port isolated active bridge DC-DC power converter is used in a wind power plant. In this example, a wind power generating unit, such as for example a wind turbine, is connected to the first primary-side port. In another example, the three-port isolated active bridge DC-DC power converter is used in a solar power plant. In this example, a solar power generating unit, such as for example a solar panel, is connected to the first primary-side port. In yet another example, the three-port isolated active bridge DC-DC power converter is used in a fuel cell electric vehicle. In this example, a fuel cell is connected to the first primary-side port.

As such, the three-port isolated active bridge DC-DC power converter provides for an integrated architecture wherein bidirectional power conversion is possible between the first primary-side port, the secondary-side port, and the second primary-side port. The bidirectional power flow is achieved by the use of the primary-side switching elements and the secondary-side switching elements, which are configured to allow for bidirectional power flow. Further, the magnetic coupling of the primary-side transformer winding and the secondary-side transformer winding is arranged for power to flow between the primary side and the secondary side.

The three-port isolated active bridge DC-DC power converter further comprises a blocking switch. The control unit is further configured to open the blocking switch to prevent power flow between the primary side and the secondary side and to close the blocking switch to allow power flow between the primary side and the secondary side. The first primary-side port and the second primary-side port are comprised in the primary side, while the secondary-side port is comprised in the secondary side. If no power flow is required between the primary side and the secondary side, it is desirable to prevent the excitation of the transformer core, which transformer core is formed by the primary-side transformer winding and the secondary-side transformer winding. To prevent the excitation of the transformer core, the three-port isolated active bridge DC-DC power converter comprises a blocking switch. The blocking switch is controlled by the control unit, which control unit opens or closes the blocking switch. If the blocking switch is closed, power flow is allowed between the primary side and the secondary side. This is for example the case to allow a power flow between the first primary-side port and the secondary-side port, and/or a power flow between the second primary-side port and the secondary-side port. If the blocking switch is opened, power flow is prevented between the primary side and the secondary side. This is for example the case to allow a power flow exclusively between the first primary-side port and the second primary-side port. In this case, the secondary side is bypassed, and the transformer core formed by the primary-side transformer winding and the secondary-side transformer winding is not, or minimally, excited.

In an embodiment according to the first aspect of the invention, the first primary-side port is an input power port, being arranged to be connected to an input power source. For example, the input power source is a fuel cell. For another example, the input power source is a solar power generating unit. Further, in the embodiment, the second primary-side port is a low voltage port, being arranged to be connected to a low voltage power storage. For example, the low voltage power storage is a low voltage battery of a vehicle. Further, in the embodiment, the secondary-side port is a high voltage port, being arranged to be connected to a high voltage power storage. For example, the high voltage power storage is a high voltage battery of a vehicle.

In an embodiment according to the first aspect of the invention, the two primary-side switching elements and the primary-side converter inductance are arranged to form a buck converter or a boost converter.

In an embodiment according to the first aspect of the invention, the primary side comprises the blocking switch.

In an embodiment according to the first aspect of the invention, the blocking switch is connected in series to the primary-side transformer winding. By connecting the blocking switch in series to the primary-side transformer winding, the blocking switch is arranged such that it interrupts the power flow between the primary side and the secondary side when opened. Specifically, when the blocking switch is opened, power flow through the primary-side transformer winding and the secondary-side transformer winding is prevented. When the blocking switch is closed, power flow through the primary-side transformer winding and the secondary-side transformer winding is allowed.

In an embodiment according to the first aspect of the invention, the secondary side comprises the blocking switch.

In an embodiment according to the first aspect of the invention, the blocking switch is connected in series to the secondary-side transformer winding. By connecting the blocking switch in series to the secondary-side transformer winding, the blocking switch is arranged such that it interrupts the power flow between the primary side and the secondary side when opened. Specifically, when the blocking switch is opened, power flow through the primary-side transformer winding and the secondary-side transformer winding is prevented. When the blocking switch is closed, power flow through the primary-side transformer winding and the secondary-side transformer winding is allowed.

In an embodiment according to the first aspect of the invention, the primary side comprises two additional primary-side switching elements. The four primary-side switching elements are arranged to form a primary-side full bridge.

An advantage of arranging two additional primary-side switching elements, wherein the four primary-side switching elements form a primary-side full bridge, is that reactive currents in some cases are minimized using the phase shift between the four primary-side switching elements and the two secondary-side switching elements. A further advantage is that the full input voltage, i.e., the voltage supplied through the first primary-side port, is available at the primary-side winding, reducing the current. In the case of a half bridge, half of the input voltage, i.e., half of the voltage supplied through the first primary-side port, is available. Alternatively, the input voltage is the voltage supplied to the primary side through the transformer core.

In an embodiment according to the first aspect of the invention, the secondary side comprises two additional secondary-side switching elements. The four secondary-side switching element are arranged to form a secondary-side full bridge.

An advantage of arranging two additional secondary-side switching elements, wherein the four secondary-side switching elements form a secondary-side full bridge, is that reactive currents can be minimized using the phase shift between the four secondary-side switching elements and the primary-side switching elements. A further advantage is that the full input voltage, i.e., the voltage supplied to the secondary side through the transformer core, is available at the secondary-side port. In the case of a half bridge, half of the input voltage, i.e., half of the voltage supplied to the secondary side through the transformer core, is available. Alternatively, the input voltage is the voltage supplied through the secondary-side port.

In an embodiment according to the first aspect of the invention, the blocking switch comprises two blocking switching elements. The two blocking switching elements are connected in anti-series. By connecting two blocking switching elements in anti-series, power flow in both directions, i.e., from the primary side to the secondary side and from the secondary side to the primary side, is preventable. To close the blocking switch, the control unit is configured to close the two blocking switching elements comprised by the blocking switch. To open the blocking switch, the control unit is configured to open the two blocking switching elements comprised by the blocking switch. The blocking switching elements are, for example, JFETs, IGBTs, GaN HEMTs, or MOSFETs.

In an embodiment according to the first aspect of the invention, the control unit is configured to control the primary-side switching elements and the secondary-side switching elements to generate a phase shift that determines the power transfer between the primary side and the secondary side. When the blocking switch is closed, a power transfer between the primary side and the secondary side is enabled. In other words, power may be transferred between the first primary-side port and the second primary-side port on the one side, and the secondary-side port on the other side. The power transfer to and from the secondary-side port is primarily controlled by the phase shift between the primary-side ports, i.e., comprising the first primary-side port and the second primary-side port, and the secondary-side port. The phase shift between the primary-side ports and the secondary-side port is achieved by the control unit controlling the duty cycle of the primary-side switching elements and the duty cycle of the secondary-side switching elements.

In an embodiment according to the first aspect of the invention, the three-port isolated active bridge DC-DC power converter is configured to enable a power flow from a first power port to a second power port. The first power port is one of the first primary-side port, the second primary-side port, and the secondary-side port. The second power port is one of the first primary-side port, the second primary-side port, and the secondary-side port. The first power port and the second power port are different.

In certain cases, a power flow is exclusively desired between two ports.

For example, a power flow is desired from the first primary-side port to the second primary-side port. For example, this is the case if all power flowing into the first primary-side port is required to power components connected to the second primary-side port. In this example, the blocking switch is opened by the control unit, preventing any power flow between the primary side and the secondary side. Further, the primary side circuitry, in particular the primary-side switching elements, is controlled by the control unit to convert power from the second primary-side port to the first primary-side port. In this case, the converter for example behaves as a buck converter or a boost converter. Specifically, the duty cycle of the primary-side switching elements determines the power transfer from the first primary-side port to the second primary-side port.

For another example, a power flow is desired from the first primary-side port to the secondary-side port. In this case, the power flowing into the first primary-side port is transferred to the secondary side, where it for example can be stored in a power storage, for example in a battery. In another example, it can be used to power components connected to the secondary-side port. In this embodiment, the blocking switch is closed by the control unit, allowing power to flow between the primary side and the secondary side. Further, the primary-side circuitry, in particular the primary-side switching elements, as well as the secondary-side circuitry, in particular the secondary-side switching elements, are controlled by the control unit to convert power from the first primary-side port to the secondary-side port. In this case, the converter behaves as an isolated DC-DC power converter between the first primary-side port and the secondary-side port. The power transfer to the secondary-side port is primarily controlled by the phase shift between the first primary-side port and the secondary-side port. This phase shift is achieved by the control unit controlling the duty cycle of the primary-side switching elements and the duty cycle of the secondary-side switching elements. In this case, a positive phase shift between the primary-side switching elements and the secondary-side switching elements achieves a power transfer from the first primary-side port to the secondary-side port.

For yet another example, a power flow is desired from the secondary-side port to the second primary-side port. For example, this is the case if power from the secondary-side port is required to power components connected to the second primary-side port. In this example, power is transferred from the secondary-side port to the second primary-side port. In this example, the blocking switch is closed by the control unit, allowing power to flow between the primary side and the secondary side. Further, the primary-side circuitry, in particular the primary-side switching elements, as well as the secondary-side circuitry, in particular the secondary-side switching elements, are controlled by the control unit to convert power from the secondary-side port to the second primary-side port. In this case, the converter behaves as an isolated DC-DC power converter between the secondary-side port and the second primary-side port. The power transfer to the second primary-side port is primarily controlled by the phase shift between the secondary-side port and the second primary-side port. This phase shift is achieved by the control unit controlling the duty cycle of the primary-side switching elements and the duty cycle of the secondary-side switching elements. In this case, a positive phase shift between the secondary-side switching elements and the primary-side switching elements achieves a power transfer from the secondary-side port to the second primary-side port. A positive phase shift between the secondary-side port and the second primary-side port implies a negative phase shift between the second primary-side port and the secondary-side port.

In other examples, a power flow is enabled from the second primary-side port to the first primary-side port, or from the secondary-side port to the first primary-side port.

In an embodiment according to the first aspect of the invention, the three-port isolated active bridge DC-DC power converter is configured to enable a power flow from a first power port and a second power port to a third power port. The first power port is one of the first primary-side port, the second primary-side port, and the secondary-side port. The second power port is one of the first primary-side port, the second primary-side port, and the secondary-side port. The third power port is one of the first primary-side port, the second primary-side port, and the secondary-side port. The first power port and the second power port and the third power port are different.

In certain cases, a power flow is desired from two ports to another port.

For example, a power flow is desired from the first primary-side port and the second primary-side port to the secondary-side port. In this case, the power flowing into the first primary-side port and the power flowing into the second primary-side port is transferred to the secondary side, where it for example can be stored in a power storage, for example in a battery. In another example, it can be used to power components connected to the secondary-side port. In this embodiment, the blocking switch is closed by the control unit, allowing power to flow between the primary side and the secondary side. Further, the primary-side circuitry, in particular the primary-side switching elements, as well as the secondary-side circuitry, in particular the secondary-side switching elements, are controlled by the control unit to convert power from the first primary-side port and the second primary-side port to the secondary-side port. In this case, the converter behaves as an isolated DC-DC power converter between the two primary-side ports and the secondary-side port. The power transfer to the secondary-side port is primarily controlled by the phase shift between the primary-side ports and the secondary-side port. This phase shift is achieved by the control unit controlling the duty cycle of the primary-side switching elements and the duty cycle of the secondary-side switching elements. In this case, a positive phase shift between the primary-side switching elements and the secondary-side switching elements achieves a power transfer from the first primary-side port and the second primary-side port to the secondary-side port.

For another example, a power flow is desired from the secondary-side port and the first primary-side port to the second primary-side port. For example, this is the case if power from the secondary-side port and the first primary-side port is required to power components connected to the second primary-side port. In this example, power is transferred from the secondary-side port and the first primary-side port to the second primary-side port. In this example, the blocking switch is closed by the control unit, allowing power to flow between the primary side and the secondary side. Further, the primary-side circuitry, in particular the primary-side switching elements, as well as the secondary-side circuitry, in particular the secondary-side switching elements, are controlled by the control unit to convert power from the secondary-side port to the second primary-side port. In this case, the converter behaves as an isolated DC-DC power converter between the secondary-side port and the second primary-side port. The power transfer to the second primary-side port is primarily controlled by the phase shift between the secondary-side port and the second primary-side port. This phase shift is achieved by the control unit controlling the duty cycle of the primary-side switching elements and the duty cycle of the secondary-side switching elements. In this case, a positive phase shift between the secondary-side switching elements and the primary-side switching elements achieves a power transfer from the secondary-side port to the second primary-side port. A positive phase shift between the secondary-side port and the second primary-side port implies a negative phase shift between the second primary-side port and the secondary-side port. Further, the primary side circuitry, in particular the primary-side switching elements, is controlled by the control unit to convert power from the first primary-side port to the second primary-side port. In this case, the converter additionally behaves as a buck converter or a boost converter. Specifically, the duty cycle of the primary-side switching elements determines the power transfer from the first primary-side port to the second primary-side port.

In another example, a power flow is enabled from the second primary-side port and the secondary-side port to the first primary-side port.

In an embodiment according to the first aspect of the invention, the three-port isolated active bridge DC-DC power converter is configured to enable a power flow from a first power port to a second power port and a third power port. The first power port is one of the first primary-side port, the second primary-side port, and the secondary-side port. The second power port is one of the first primary-side port, the second primary-side port, and the secondary-side port. The third power port is one of the first primary-side port, the second primary-side port, and the secondary-side port. The first power port and the second power port and the third power port are different.

In certain cases, a power flow is desired from a single port to two other ports.

For example, a power flow is desired from the first primary-side port to the second primary-side port and the secondary-side port. In this case, the power flowing into the first primary-side port is transferred to the second primary-side port and the secondary-side port, where it for example can be stored in a power storage, for example in a battery. In another example, it can be used to power components connected to the secondary-side port and/or components connected to the second primary-side port. In this embodiment, the blocking switch is closed by the control unit, allowing power to flow between the primary side and the secondary side. Further, the primary-side circuitry, in particular the primary-side switching elements, as well as the secondary-side circuitry, in particular the secondary-side switching elements, are controlled by the control unit to convert power from the first primary-side port to the secondary-side port. In this case, the converter behaves as an isolated DC-DC power converter between the first primary-side port and the secondary-side port. The power transfer to the secondary-side port is primarily controlled by the phase shift between the first primary-side port and the secondary-side port. This phase shift is achieved by the control unit controlling the duty cycle of the primary-side switching elements and the duty cycle of the secondary-side switching elements. In this case, a positive phase shift between the primary-side switching elements and the secondary-side switching elements achieves a power transfer from the first primary-side port to the secondary-side port. Further, the primary side circuitry, in particular the primary-side switching elements, is controlled by the control unit to convert power from the first primary-side port to the second primary-side port. In this case, the converter additionally behaves as a buck converter or a boost converter. Specifically, the duty cycle of the primary-side switching elements determines the power transfer from the first primary-side port to the second primary-side port.

For another example, a power flow is desired from the secondary-side port to the first primary-side port and the second primary-side port. For example, this is the case if power from the secondary-side port is required to power components connected to the first primary-side port and components connected to the second primary-side port. In this example, power is transferred from the secondary-side port to the first primary-side port and the second primary-side port. In this example, the blocking switch is closed by the control unit, allowing power to flow between the primary side and the secondary side. Further, the primary-side circuitry, in particular the primary-side switching elements, as well as the secondary-side circuitry, in particular the secondary-side switching elements, are controlled by the control unit to convert power from the secondary-side port to the first primary-side port and the second primary-side port. In this case, the converter behaves as an isolated DC-DC power converter between the secondary-side port and the primary-side ports. The power transfer to the first primary-side port and the second primary-side port is primarily controlled by the phase shift between the secondary-side port and the primary-side ports. This phase shift is achieved by the control unit controlling the duty cycle of the primary-side switching elements and the duty cycle of the secondary-side switching elements. In this case, a positive phase shift between the secondary-side switching elements and the primary-side switching elements achieves a power transfer from the secondary-side port to the first primary-side port and the second primary-side port. A positive phase shift between the secondary-side port and the primary-side ports implies a negative phase shift between the primary-side ports and the secondary-side port.

In another example, a power flow is enabled from the second primary-side port to the first primary-side port and the secondary-side port.

According to a second aspect of the invention, the objective is achieved by a three-port isolated active bridge DC-DC power converter system comprising a plurality of three-port isolated active bridge DC-DC power converters according the first aspect of the invention, a first system port, and a second system port. The plurality of three-port isolated active bridge DC-DC power converters are coupled in parallel through their second primary side ports to form the first system port. The plurality of three-port isolated active bridge DC-DC power converters are coupled in series through their secondary-side ports to form the second system port.

To scale the power converter for more power inputs, the three-port isolated active bridge DC-DC power converter system comprises a plurality of three-port isolated active bridge DC-DC power converters. As such, a plurality of first primary-side ports are available for the three-port isolated active bridge DC-DC power converter system. As such, the power converter system is for example configured to be connected to a plurality of power generating units. The power generating units are for example solar power generating units, or fuel cells, or wind turbines.

It is an objective to provide a power converter system with a single secondary-side port and a single second primary-side port. To achieve this objective, the secondary-side ports of the three-port isolated active bridge DC-DC power converters are connected in series. This forms a second system port. By connecting the secondary-side ports of the power converters comprised by the power converter system in series, it is possible for a required voltage gain between the primary side and the secondary side to be reduced. Further, the voltage rating for the semiconductors, i.e., the primary-side switching elements, the secondary-side switching elements, and the blocking switches used in the circuitry of the three-port isolated active bridge DC-DC power converter system is reduced. This increases the reliability of the system and reduces its cost. Further, a high dynamic output voltage range for the second system port is achieved in the architecture. If, for example, the power input from the first primary-side port of a three-port isolated active bridge DC-DC power converter comprised by the power converter system is reduced, then the output voltage, i.e., the voltage of the secondary-side port, is compensated. For example, the power input from the first primary-side port is reduced if the solar irradiance of a solar generating unit connected to the first primary-side port is reduced. In an example, the reduced input power is compensated by transferring the power from the first primary-side port to the first system port instead of to the second system port. In an alternative example, the reduced input power is compensated by additionally transferring power from the first system port to the second system port. In yet an alternative example, the reduced input power is compensated by additionally transferring power from the second system port to the first system port.

In an embodiment according to the second aspect of the invention, the first system port is a low voltage port, being arranged to be connected to a low voltage power storage and the second system port is a high voltage port, being arranged to be connected to a high voltage power storage. For example the high voltage power storage is a high voltage battery in a vehicle, and the low voltage power storage is a low voltage battery in a vehicle.

In an embodiment according to the second aspect of the invention, one of the three-port isolated active bridge DC-DC power converters is designated as a master power converter. The control unit of the master power converter is configured to control the output current of the master power converter based on an output current setpoint. The remaining three-port isolated active bridge DC-DC power converters are designated as slave power converters. The control unit of each of the slave power converters is configured to control the output voltage of its respective slave power converter to match the output voltage of the master power converter. Alternatively, the control unit of each of the slave power converters is configured to control the output voltage of its respective slave power converter to be the inverse of the product of the number of three-port isolated active bridge DC-DC power converters of the three-port isolated active bridge DC-DC power converter system and the output voltage of the second system port.

In a case where power is transferred from the primary-side ports to the secondary-side port, a control strategy is employed by the three-port isolated active bridge DC-DC power converters comprised by the power converter system. The primary-side ports are the first primary-side ports and/or the first system port. The secondary-side port is the second system port. A constraint for the control strategy is that the output voltage of the second system port is fixed. For example, the output voltage of the second system port is 380V. The control strategy is designed such that the output voltages of the individual three-port isolated active bridge DC-DC power converters is balanced. To achieve this objective, one of the three-port isolated active bridge DC-DC power converter comprised by the power converter system is designated as the master power converter. The master power converter receives an output current setpoint. For example, the output current setpoint is 1 A, or 2 A, or 5 A, or 10 A. The control unit of the master power converter is configured such that the output current of the master power converter is controlled based on the output current setpoint and the output voltage of the second system port. The output current is the output current flowing to the secondary-side port of the master power converter. The slave power converters are connected in series through their secondary-side ports to the secondary-side port of the master power converter. While the master power converter controls its output current, the slave power converters control their output voltages to match the output voltage of the master power converter. The output voltage of each slave power converter is the output voltage of the secondary-side port of the respective slave power converter. The output voltage of the master power converter is the output voltage of the secondary-side port of the master power converter. Alternatively, the slave power converters control their output voltages to be the inverse of the product of the number of three-port isolated active bridge DC-DC power converters of the three-port isolated active bridge DC-DC power converter system and the output voltage of the second system port. In this last case, the voltage output of each slave power converter is based on the formula $V_{HV}/nr_{pc}$, wherein $nr_{pc}$ is the number of three-port isolated active bridge DC-DC power converters of the three-port isolated active bridge DC-DC power converter system and $V_{HV}$ is the output voltage of the second system port. In this way, the voltage output of the individual three-port isolated active bridge DC-DC power converters is balanced. The voltage output of the individual three-port isolated active bridge DC-DC power converters is controlled by controlling the phase shift between their primary-side ports and their secondary-side ports.

According to a third aspect according to the invention, the objective is achieved by a multi-port isolated active bridge DC-DC power converter, comprising a control unit, a primary side, and a secondary side.

The primary side comprises a plurality of first primary-side ports, a second primary-side port, two primary-side switching elements for each first primary-side port, a primary-side converter inductance for each first primary-side port, and a primary-side transformer winding for each first primary-side port. Each pair of primary-side switching elements and a respective primary-side converter inductance are arranged to form a half-bridge arrangement for bidirectionally converting power between a respective first primary-side port and the second primary-side port. The control unit is configured to control each pair of primary-side switching elements to convert power between a respective first primary-side port and the second primary-side port. The primary-side switching elements are, for example, JFETs, IGBTs, GaN HEMTs, or MOSFETs.

The primary-side circuit is arranged such that it forms, for each first primary-side port, a power converter between the respective first primary-side port and the second primary-side port. For example, in the case that the voltage is to be stepped down between a respective first primary-side port and the second primary-side port, the primary side forms, for each first primary-side port, a buck converter between the respective first primary-side port and the second primary-side port. For another example, in the case that the voltage is to be stepped up between a respective first primary-side port and the second primary-side port, the primary side forms, for each first primary-side port, a boost converter between the respective first primary-side port and the second primary-side port. To increase the efficiency of the power converter, the first primary-side ports and the second primary-side port are connected without isolation.

The secondary side comprises a secondary-side port, two secondary-side switching elements, and a secondary-side transformer winding. In a preferential embodiment, the secondary side comprises a single secondary-side transformer winding. The secondary-side transformer winding is magnetically coupled to the primary-side transformer winding. The primary-side switching elements, the primary-side transformer windings, the two secondary-side switching elements, and the secondary-side transformer winding are arranged to form an isolated DC-DC converter between the primary side and the secondary side. In other words, the primary-side switching elements, the primary-side transformer windings, the two secondary-side switching elements, and the secondary-side transformer winding are arranged to form an isolated DC-DC converter between the plurality of first primary-side ports and the secondary-side port. The control unit is further configured to control the primary-side switching elements and the two secondary-side switching elements for converting power between the primary-side ports and the secondary-side port. The secondary-side switching elements are, for example, JFETs, IGBTs, GaN HEMTs, or MOSFETs.

The first primary-side ports, the second primary-side port, and the secondary-side port each comprise a pair of terminals, which terminals are for example used to connect to an external electrical circuit. For example, the second primary-side port is connected to a low voltage bus, which connects the multi-port isolated active bridge DC-DC power converter to a low voltage battery. For example, the secondary-side port is connected to a high voltage bus, which connects the multi-port isolated active bridge DC-DC power converter to a high voltage battery. For example, the first primary-side ports each connect to a power generating unit. The power generating unit is for example a solar power generating unit, or a fuel cell, or a wind turbine. For example, the multi-port isolated active bridge DC-DC power converter is used in a wind power plant. In this example, a wind power generating unit, such as for example a wind turbine, is connected to a respective first primary-side port. In another example, the multi-port isolated active bridge DC-DC power converter is used in a solar power plant. In this example, a solar power generating unit, such as for example a solar panel, is connected to a respective first primary-side port. In yet another example, the multi-port isolated active bridge DC-DC power converter is used in a fuel cell electric vehicle. In this example, a fuel cell is connected to a respective first primary-side port.

As such, the multi-port isolated active bridge DC-DC power converter provides for an integrated architecture wherein bidirectional power conversion is possible between the first primary-side ports, the secondary-side port, and the second primary-side port. The bidirectional power flow is achieved by the use of the primary-side switching elements and the secondary-side switching elements, which are configured to allow for bidirectional power flow. Further, the magnetic coupling of the primary-side transformer windings and the secondary-side transformer winding is arranged for power to flow between the primary side and the secondary side.

In an embodiment according to the third aspect of the invention, each first primary-side port is an input power port, being arranged to be connected to an input power source. For example, the input power source is a fuel cell. For another example, the input power source is a solar power generating unit. Further, in the embodiment, the second primary-side port is a low voltage port, being arranged to be connected to a low voltage power storage. For example, the low voltage power storage is a low voltage battery of a vehicle. Further, in the embodiment, the secondary-side port is a high voltage port, being arranged to be connected to a high voltage power storage. For example, the high voltage power storage is a high voltage battery of a vehicle.

In an embodiment according to the third aspect of the invention, each pair of primary-side switching elements and the respective primary-side converter inductance are arranged to form a buck converter or a boost converter.

In an embodiment according to the third aspect of the invention, the primary side comprises two additional primary-side switching elements for each first primary-side port. Each quadruple of primary-side switching elements are arranged to form a primary-side full bridge for each first primary-side port.

An advantage of arranging two additional primary-side switching elements for each first primary-side port, wherein each quadruple of primary-side switching elements form a primary-side full bridge for each first primary-side port, is that reactive currents in some cases are minimized using the phase shift between the quadruple of primary-side switching elements and the two secondary-side switching elements. A further advantage is that the full input voltage, i.e., the voltage supplied through a respective first primary-side port, is available at a respective primary-side winding, reducing the current. In the case of a half bridge, half of the input voltage, i.e., half of the voltage supplied through the respective first primary-side port, is available. Alternatively, the input voltage is the voltage supplied to the primary side through the transformer core.

In an embodiment according to the third aspect of the invention, the secondary side comprises two additional secondary-side switching elements. The four secondary-side switching element are arranged to form a secondary-side full bridge.

An advantage of arranging two additional secondary-side switching elements, wherein the four secondary-side switching elements form a secondary-side full bridge, is that reactive currents can be minimized using the phase shift between the four secondary-side switching elements and the primary-side switching elements. A further advantage is that the full input voltage, i.e., the voltage supplied to the secondary side through the transformer core, is available at the secondary-side port. In the case of a half bridge, half of the input voltage, i.e., half of the voltage supplied to the secondary side through the transformer core, is available. Alternatively, the input voltage is the voltage supplied through the secondary-side port.

In an embodiment according to the third aspect of the invention, the multi-port isolated active bridge DC-DC power converter comprises a blocking switch for each first primary-side port. The control unit is further configured to open the blocking switches to prevent power flow between the primary side and the secondary side and to close the blocking switches to allow power flow between the primary side and the secondary side.

The primary side comprises the first primary-side ports and the second primary-side port, while the secondary-side port is comprised by the secondary side. If no power flow is required between the primary side and the secondary side, it is desirable to prevent the excitation of the transformer core, which transformer core is formed by the primary-side transformer windings and the secondary-side transformer winding. To prevent or minimize the excitation of the transformer core, the multi-port isolated active bridge DC-DC power converter comprises a blocking switch for each first primary-side port. The blocking switches are controlled by the control unit, which opens or closes the blocking switches. If the blocking switches are closed, power flow is allowed between the primary side and the secondary side. This is for example the case to allow a power flow between the first primary-side ports and the secondary-side port, and/or a power flow between the second primary-side port and the secondary-side port. If the blocking switches are opened, power flow is prevented between the primary side and the secondary side. This is for example the case to allow a power flow exclusively between the first primary-side ports and the second primary-side port. In this case, the secondary side is bypassed, and the transformer core, formed by the primary-side transformer windings and the secondary-side transformer winding, is not, or minimally, excited.

In an embodiment according to the third aspect of the invention, the primary side comprises the blocking switches.

In an embodiment according to the third aspect of the invention, each blocking switch is connected in series to a respective primary-side transformer winding. By connecting each blocking switch in series to a respective primary-side transformer winding, the blocking switches are arranged such that each one of the blocking switches interrupts the power flow between a single first primary-side port of the primary side and the secondary side when opened. Specifically, when a blocking switch is opened, power flow through a respective primary-side transformer winding and the secondary-side transformer winding is prevented. When the blocking switch is closed, power flow through the respective primary-side transformer winding and the secondary-side transformer winding is allowed. In the case that all blocking switches are opened, power flow between the primary side and the secondary side is prevented. In the case that all blocking switches are closed, power flow through all primary-side transformer windings and the secondary-side transformer winding is allowed.

In an embodiment according to the third aspect of the invention, the secondary side further comprises a blocking switch. The control unit is further configured to open the blocking switch to prevent power flow between the primary side and the secondary side and to close the blocking switch to allow power flow between the primary side and the secondary side.

The primary side comprises the first primary-side ports and the second primary-side port, while the secondary-side port is comprised by the secondary side. If no power flow is required between the primary side and the secondary side, it is desirable to prevent or minimize the excitation of the transformer core, which transformer core is formed by the primary-side transformer windings and the secondary-side transformer winding. To prevent the excitation of the transformer core, the secondary side comprises a blocking switch. The blocking switch is controlled by the control unit, which opens or closes the blocking switch. If the blocking switch is closed, power flow is allowed between the primary side and the secondary side. This is for example the case to allow a power flow between the first primary-side ports and the secondary-side port, and/or a power flow between the second primary-side port and the secondary-side port. If the blocking switch is opened, power flow is prevented between the primary side and the secondary side. This is for example the case to allow a power flow exclusively between the first primary-side ports and the second primary-side port. In this case, the secondary side is bypassed, and the transformer core, formed by the primary-side transformer windings and the secondary-side transformer winding, is not, or minimally, excited.

In an embodiment according to the third aspect of the invention, the blocking switch is connected in series to the secondary-side transformer winding. By connecting the blocking switch in series to the secondary-side transformer winding, the blocking switch is arranged such that the blocking switch interrupts the power flow between the secondary side and the primary side when opened. Specifically, when the blocking switch is opened, power flow through the secondary-side transformer winding and the primary-side transformer windings is prevented. When the blocking switch is closed, power flow through the primary-side transformer windings and the secondary-side transformer winding is allowed.

In an embodiment according to the third aspect of the invention, each blocking switch comprises two blocking switching elements. Each pair of blocking switching elements is connected in anti-series. By connecting two blocking switching elements in anti-series, power flow in both directions, i.e., from the primary side to the secondary side and from the secondary side to the primary side, is preventable. To close the blocking switches, the control unit is configured to close the pair of blocking switching elements comprised by each blocking switch. To open the blocking switches, the control unit is configured to open the pair of blocking switching elements comprised by each blocking switch. The blocking switching elements are, for example, JFETs, IGBTs, GaN HEMTs, or MOSFETs.

In an embodiment according to the third aspect of the invention, the control unit is configured to control the primary-side switching elements and the secondary-side switching elements to generate a phase shift that determines the power transfer between the primary side and the secondary side. When the blocking switching elements are closed, a power transfer between the primary side and the secondary side is enabled. In other words, power may be transferred between the first primary-side ports and the second primary-side port on the one side, and the secondary-side port on the other side. The power transfer to and from the secondary-side port is primarily controlled by the phase shift between the primary-side ports, i.e., the first primary-side ports and the second primary-side port, and the secondary-side port. The phase shift between the primary-side ports and the secondary-side port is achieved by the control unit controlling the duty cycle of the primary-side switching elements and the duty cycle of the secondary-side switching elements.

In an embodiment according to the third aspect of the invention, the multi-port isolated active bridge DC-DC power converter is configured to enable a power flow from a first power port to a second power port. The first power port is one of the second primary-side port and the secondary-side port. The second power port is one of the second primary-side port and the secondary-side port. The first power port and the second power port are different.

In certain cases, a power flow is exclusively desired between two ports.

For example, a power flow is desired from the secondary-side port to the second primary-side port. For example, this is the case if power from the secondary-side port is required to power components connected to the second primary-side port. In this example, power is transferred from the secondary-side port to the second primary-side port. In this example, the blocking switch is closed by the control unit, allowing power to flow between the primary side and the secondary side. Further, the primary-side circuitry, in particular the primary-side switching elements, as well as the secondary-side circuitry, in particular the secondary-side switching elements, are controlled by the control unit to convert power from the secondary-side port to the second primary-side port. In this case, the converter behaves as an isolated DC-DC power converter between the secondary-side port and the second primary-side port. The power transfer to the second primary-side port is primarily controlled by the phase shift between the secondary-side port and the second primary-side port. This phase shift is achieved by the control unit controlling the duty cycle of the primary-side switching elements and the duty cycle of the secondary-side switching elements. In this case, a positive phase shift between the secondary-side switching elements and the primary-side switching elements achieves a power transfer from the secondary-side port to the second primary-side port. A positive phase shift between the secondary-side port and the second primary-side port implies a negative phase shift between the second primary-side port and the secondary-side port.

In another example, a power flow is enabled from the second primary-side port to the secondary-side port.

In an embodiment according to the third aspect of the invention, the multi-port isolated active bridge DC-DC power converter is configured to enable a power flow from each of the first primary-side power ports to a first power port. The first power port is one of the second primary-side port and the secondary-side port.

In certain cases, a power flow is exclusively desired between the first primary-side ports and another port.

For example, a power flow is desired from each of the first primary-side ports to the second primary-side port. For example, this is the case if all power flowing into the first primary-side ports is required to power components connected to the second primary-side port. In this example, the blocking switch is opened by the control unit, preventing any power flow between the primary side and the secondary side. Further, the primary side circuitry, in particular the primary-side switching elements, is controlled by the control unit to convert power from the first primary-side ports to the second primary-side port. In this case, the converter for example behaves as a buck converter or a boost converter. Specifically, the duty cycle of the primary-side switching elements determines the power transfer from each of the first primary-side ports to the second primary-side port.

In another example, a power flow is enabled from each of the first primary-side ports to the secondary-side port.

In an embodiment according to the third aspect of the invention, the multi-port isolated active bridge DC-DC power converter is configured to enable a power flow from each of the first primary-side power ports and a first power port to a second power port. The first power port is one of the second primary-side port and the secondary-side port. The second power port is one of the second primary-side port and the secondary-side port. The first power port and the second power port are different.

In certain cases, a power flow is desired from each of the first primary ports and a power port to another power port.

For example, a power flow is desired from each of the first primary-side ports and the second primary-side port to the secondary-side port. In this case, the power flowing into each of the first primary-side ports and the power flowing into the second primary-side port is transferred to the secondary-side port, where it for example can be stored in a power storage, for example in a battery. In another example, it can be used to power components connected to the secondary-side port. In this embodiment, the blocking switch is closed by the control unit, allowing power to flow between the primary side and the secondary side. Further, the primary-side circuitry, in particular the primary-side switching elements, as well as the secondary-side circuitry, in particular the secondary-side switching elements, are controlled by the control unit to convert power from each of the first primary-side ports and the second primary-side port to the secondary-side port. In this case, the converter behaves as an isolated DC-DC power converter between the primary-side ports and the secondary-side port. The power transfer to the secondary-side port is primarily controlled by the phase shift between each of the first primary-side ports, the second primary-side port and the secondary-side port. This phase shift is achieved by the control unit controlling the duty cycle of the primary-side switching elements and the duty cycle of the secondary-side switching elements. In this case, a positive phase shift between the primary-side switching elements and the secondary-side switching elements achieves a power transfer from the first primary-side port and the second primary-side ports to the secondary-side port.

For another example, a power flow is desired from each of the first primary-side ports and the secondary-side port to the second primary-side port. For example, this is the case if power from the secondary-side port and each of the first primary-side ports is required to power components connected to the second primary-side port. In this example, power is transferred from the secondary-side port and the first primary-side port to the second primary-side port. In this example, the blocking switch is closed by the control unit, allowing power to flow between the primary side and the secondary side. Further, the primary-side circuitry, in particular the primary-side switching elements, as well as the secondary-side circuitry, in particular the secondary-side switching elements, are controlled by the control unit to convert power from the secondary-side port to the second primary-side port. In this case, the converter behaves as an isolated DC-DC power converter between the secondary-side port and the second primary-side port. The power transfer to the second primary-side port is primarily controlled by the phase shift between the secondary-side port and the second primary-side port. This phase shift is achieved by the control unit controlling the duty cycle of the primary-side switching elements and the duty cycle of the secondary-side switching elements. In this case, a positive phase shift between the secondary-side switching elements and the primary-side switching elements achieves a power transfer from the secondary-side port to the second primary-side port. A positive phase shift between the secondary-side port and the second primary-side port implies a negative phase shift between the second primary-side port and the secondary-side port. Further, the primary side circuitry, in particular the primary-side switching elements, is controlled by the control unit to convert power from each of the first primary-side ports to the second primary-side port. In this case, the converter additionally behaves, for example, as a buck converter or a boost converter. Specifically, the duty cycle of the primary-side switching elements determines the power transfer from each of the first primary-side ports to the second primary-side port.

In an embodiment according to the third aspect of the invention, the multi-port isolated active bridge DC-DC power converter is configured to enable a power flow from a first power port to each of the first primary-side power ports. The first power port is one of the second primary-side port and the secondary-side port.

In an embodiment according to the third aspect of the invention, the multi-port isolated active bridge DC-DC power converter is configured to enable a power flow from a first power port to each of the first primary-side power ports and a second power port. The first power port is one of the second primary-side port and the secondary-side port. The second power port is one of the second primary-side port and the secondary-side port. The first power port and the second power port are different.

In certain cases, a power flow is desired from a single port to each of the first primary-side ports and another port.

For example, a power flow is desired from the secondary-side port to each of the first primary-side ports and the second primary-side port. For example, this is the case if power from the secondary-side port is required to power components connected to the first primary-side ports and components connected to the second primary-side port. In this example, power is transferred from the secondary-side port to the first primary-side ports and the second primary-side port. In this example, the blocking switch is closed by the control unit, allowing power to flow between the primary side and the secondary side. Further, the primary-side circuitry, in particular the primary-side switching elements, as well as the secondary-side circuitry, in particular the secondary-side switching elements, are controlled by the control unit to convert power from the secondary-side port to the first primary-side ports and the second primary-side port. In this case, the converter behaves as an isolated DC-DC power converter between the secondary side and the primary side.

The power transfer to the first primary-side ports and the second primary-side port is primarily controlled by the phase shift between the secondary-side port and the primary-side ports. This phase shift is achieved by the control unit controlling the duty cycle of the primary-side switching elements and the duty cycle of the secondary-side switching elements. In this case, a positive phase shift between the secondary-side switching elements and the primary-side switching elements achieves a power transfer from the secondary-side port to the first primary-side ports and the second primary-side port. A positive phase shift between the secondary-side port and the primary-side ports implies a negative phase shift between the primary-side ports and the secondary-side port.

In another example, a power flow is enabled from the second primary-side port to the first primary-side ports and the secondary-side port.

According to a fourth aspect of the invention, the objective is achieved by a multi-port isolated active bridge DC-DC power converter system comprising a plurality of multi-port isolated active bridge DC-DC power converters according the third aspect of the invention, a first system port, and a second system port. The plurality of multi-port isolated active bridge DC-DC power converters are coupled in parallel through their second primary side ports to form the first system port. The plurality of multi-port isolated active bridge DC-DC power converters are coupled in series through their secondary-side ports to form the second system port.

To scale the power converter for more power inputs, the multi-port isolated active bridge DC-DC power converter system comprises a plurality of multi-port isolated active bridge DC-DC power converters. As such, a plurality of first primary-side ports are available for the multi-port isolated active bridge DC-DC power converter system. As such, the power converter system is for example configured to be connected to a plurality of power generating units. The power generating units are for example solar power generating units, or fuel cells, or wind turbines.

It is an objective to provide a power converter system with a single secondary-side port and a single second primary-side port. To achieve this objective, the secondary-side ports of the multi-port isolated active bridge DC-DC power converters are connected in series. This forms a second system port. By connecting the secondary-side ports in series, it is possible for a required voltage gain between the primary side and the secondary side to be reduced. Further, the voltage rating for the semiconductors, i.e., the primary-side switching elements, the secondary-side switching elements, and the blocking switches, used in the circuitry of the multi-port isolated active bridge DC-DC power converter system, is reduced. This increases the reliability of the system and reduces its cost. Further, a high dynamic output voltage range for the second system port is achieved in the architecture. If, for example, the power input of any of the first primary-side ports of a multi-port isolated active bridge DC-DC power converter comprised by the power converter system is reduced, then the output voltage, i.e., the voltage of the secondary-side port, is compensated. For example, the power input from a first primary-side port is reduced if the solar irradiance of a solar generating unit connected to that first primary-side port is reduced. In an example, the reduced input power is compensated by transferring the power from the first primary-side ports to the first system port instead of the second system port. In an alternative example, the reduced input power is compensated by additionally transferring power from the first system port to the second system port. In yet an alternative example, the reduced input power is compensated by additionally transferring power from the second system port to the first system port.

In an embodiment according to the fourth aspect of the invention, the first system port is a high voltage port, being arranged to be connected to a high voltage power storage and the second system port is a low voltage port, being arranged to be connected to a low voltage power storage. For example the high voltage power storage is a high voltage battery in a vehicle, and the low voltage power storage is a low voltage battery in a vehicle.

In an embodiment according to the fourth aspect of the invention, one of the multi-port isolated active bridge DC-DC power converters is designated as a master power converter. The control unit of the master power converter is configured to control the output current of the master power converter based on an output current setpoint. The remaining multi-port isolated active bridge DC-DC power converters are designated as slave power converters. The control unit of each of the slave power converters is configured to control the output voltage of its respective slave power converter to match the output voltage of the master power converter. Alternatively, the control unit of each of the slave power converters is configured to control the output voltage of its respective slave power converter to be the inverse of the product of the number of multi-port isolated active bridge DC-DC power converters of the multi-port isolated active bridge DC-DC power converter system and the output voltage of the first system port.

In a case where power is transferred from the primary-side ports to the secondary-side port, a control strategy is employed by the multi-port isolated active bridge DC-DC power converters comprised by the power converter system. The primary-side ports are the first primary-side ports and/or the first system port. The secondary-side port is the second system port. A constraint for the control strategy is that the output voltage of the second system port is fixed. For example, the output voltage of the second system port is 380V. The control strategy is designed such that the output voltages of the individual multi-port isolated active bridge DC-DC power converters is balanced. To achieve this objective, one of the multi-port isolated active bridge DC-DC power converter is designated as the master power converter. The master power converter receives an output current setpoint. For example, the output current setpoint is 1 A, or 2 A, or 5 A, or 10 A. The control unit of the master power converter is configured such that the output current of the master power converter is controlled based on the output current setpoint and the output voltage of the second system port. The output current is the output current flowing to the secondary-side port of the master power converter. The slave power converters are connected in series through their secondary-side ports to the secondary-side port of the master power converter. While the master power converter controls its output current, the slave power converters control their output voltages to match the output voltage of the master power converter. The output voltage of each slave power converter is the output voltage of the secondary-side port of the respective slave power converter. The output voltage of the master power converter is the output voltage of the secondary-side port of the master power converter. Alternatively, the slave power converters control their output voltages to be the inverse of the product of the number of multi-port isolated active bridge DC-DC power converters of the multi-port isolated active bridge DC-DC power converter system and the output voltage of the second system port. In this last case, the voltage output of each slave power converter is based on the formula $V_{HV}/nr_{pc}$, wherein $nr_{pc}$ is the number of multi-port isolated active bridge DC-DC power converters of the three-port isolated active bridge DC-DC power converter system and $V_{HV}$ is the output voltage of the second system port. In this way, the voltage output of the individual multi-port isolated active bridge DC-DC power converters is balanced. The voltage output of the individual multi-port isolated active bridge DC-DC power converters is controlled by controlling the phase shift between their primary-side ports and their secondary-side ports.

According to a fifth aspect of the invention, the objective is achieved by a solar power assembly, comprising a plurality of solar power generating units and a power converter system. The power converter system is either a three-port isolated active bridge DC-DC power converter system according to the second aspect of the invention or a multi-port isolated active bridge DC-DC power converter system according to the fourth aspect of the invention. Each solar power generating unit of the plurality of solar power generating units is connected to a first primary-side port of the power converter system.

The power converter system comprises a plurality of first primary-side ports, for example, 2 or 4 or 10 or 24. The first primary-side ports are comprised by the power converters comprised by the power converter system. For example, 24 first primary-side ports of the power converter system are comprised by 12 multi-port isolated active bridge DC-DC power converter systems, each comprising 2 first primary-side ports. Each first primary-side port is arranged to be connected to a power generating unit. For example, the power generating units are solar power generating units, or fuel cells, or wind turbines. According to the fifth aspect of the invention, the solar power generating units are solar power generating units. For example, the solar power generating units are solar panels, or strips of solar cells. For example, the solar power generating units are configured to be arranged on a surface, such as for example the body of a vehicle. The power that is generated by the individual solar power generating units is to be converted for further use. In order to achieve this goal, each solar power generating unit is electrically connected to a first primary-side port of the power converter system. The power converter system is configured to transform the input power generated by the solar power generating units to output power, flowing out of its first system port and/or its second system port.

According to a sixth aspect of the invention, the objective is achieved by a vehicle, comprising: a body, a solar power assembly according to the fifth aspect of the invention, a low voltage battery, and a high voltage battery. The plurality of solar power generating units of the solar power assembly are mechanically attached to the body. The low voltage battery is connected to the first system port of the power converter system of the solar power assembly and the high voltage battery is connected to the second system port of the power converter system of the solar power assembly.

The vehicle comprises a low voltage battery, which is connected to a low voltage bus, wherein the low voltage bus powers certain electrical components of the vehicle. The electrical components powered by the low voltage bus include, for example, electrically powered windows and the lights of the vehicle. The vehicle further comprises a high voltage battery, which is connected to a high voltage bus. The high voltage bus powers certain electrical components of the vehicle. The electrical components powered by the high voltage bus include, for example, the HVAC system and an electromotor or multiple electromotors for propelling the vehicle. The low voltage battery is electrically connected, through the low voltage bus, to the first system port of the power converter system. This allows power to flow from and to the low voltage battery. The high voltage battery is electrically connected, through the high voltage bus, to the second system port of the power converter system. This allows power to flow from and to the high voltage battery.

By mechanically attaching the plurality of solar power generating units of the solar power assembly to the body of the vehicle, and electrically connecting them to the power converter system, the solar power generating units generate power when they are exposed to the sun. The power generated by the solar power generating units flows through the first primary-side port with which they are electrically connected to the power converter system. The power converter system is configured to convert the power generated by the solar power generating units such that it can be used by the vehicle, in particular by its low voltage battery and high voltage battery.

In this way, a partially autonomous vehicle is provided, which vehicle is configured to power its electrical components using power generated by its solar power generating units.

BRIEF DESCRIPTION OF THE FIGURES

The invention is described below with reference to the figures. These figures serve as examples to illustrate the invention, and will not be construed as limiting the scope of the claims. In the different figures, like features are indicated by the like reference numerals.

In the figures:

FIG. 6a schematically shows a three-port isolated active bridge DC-DC power converter system according to an embodiment of the second aspect of the invention.

FIG. 6b schematically shows a multi-port isolated active bridge DC-DC power converter system according to an embodiment of the fourth aspect of the invention.

DETAILED DESCRIPTION

Figure 1:
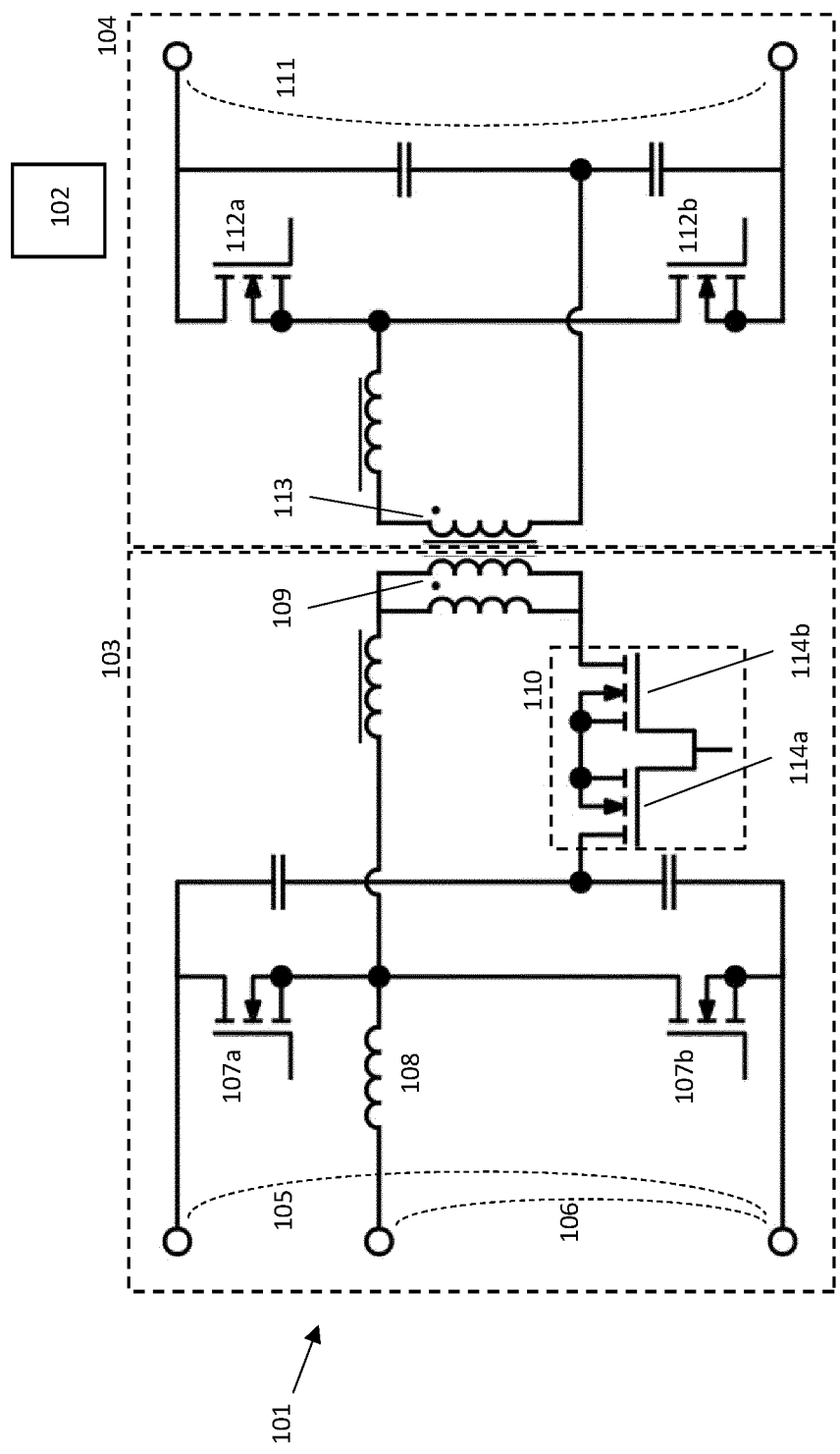
FIG. 1 schematically shows a three-port active bridge DC-DC power converter according to a first embodiment of the first aspect of the invention.
Figure 2:
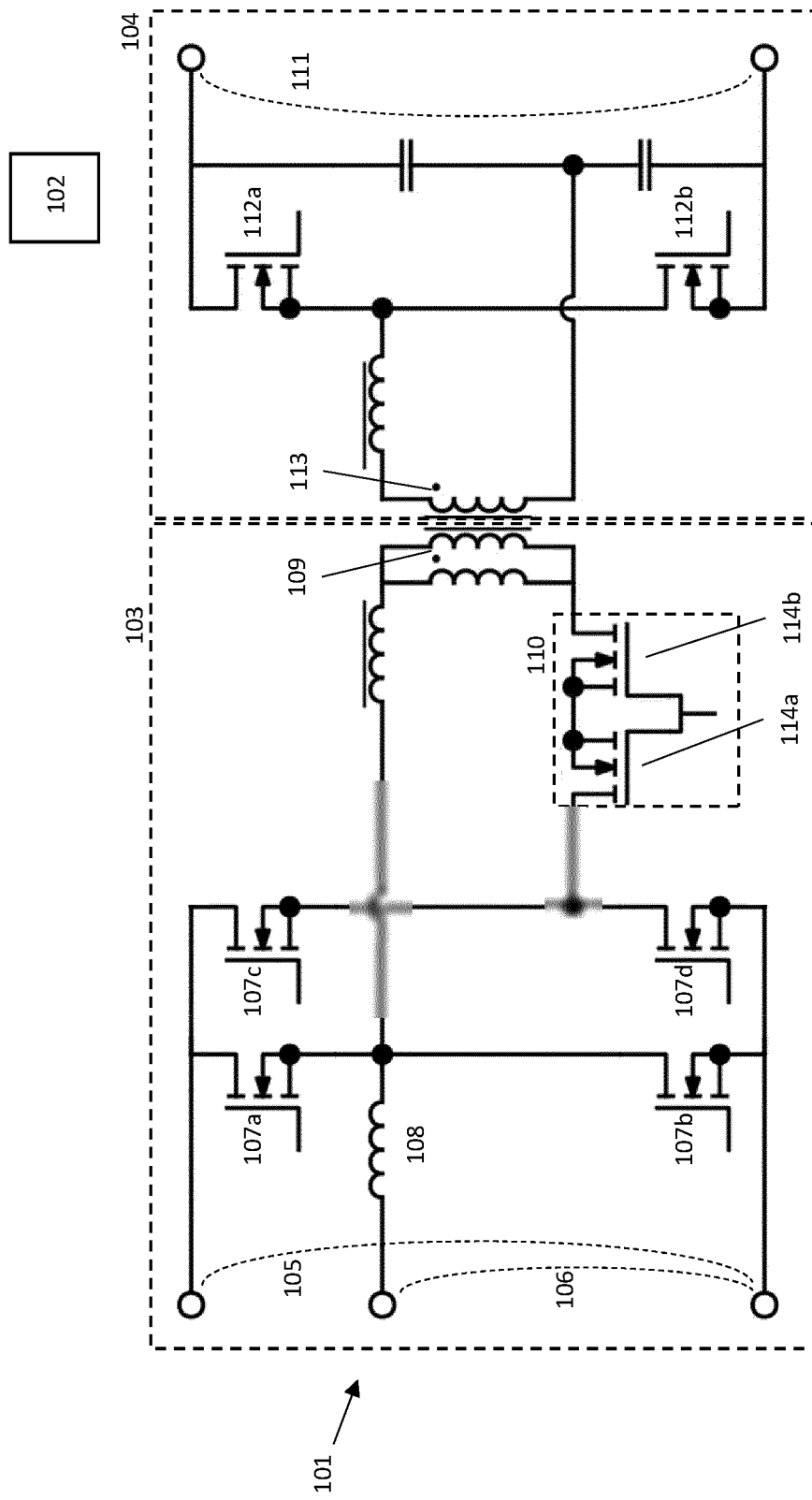
FIG. 2 schematically shows a three-port active bridge DC-DC power converter according to a second embodiment of the first aspect of the invention.
Figure 3:
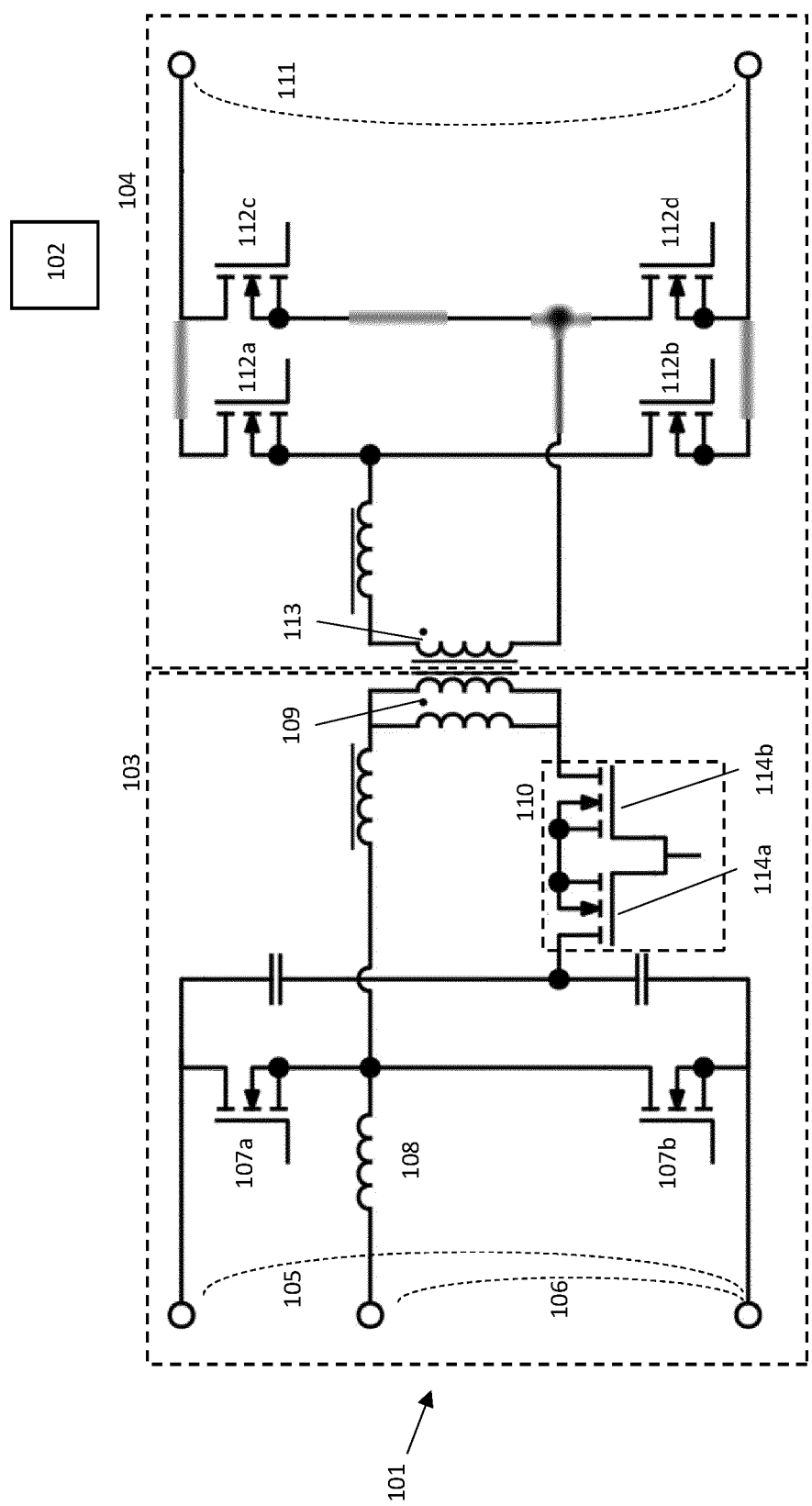
FIG. 3 schematically shows a three-port active bridge DC-DC power converter according to a third embodiment of the first aspect of the invention.

FIG. 1, FIG. 2, and FIG. 3 schematically show a three-port active bridge DC-DC power converter (101) according to a first, second, and third embodiment of the first aspect of the invention. In the figure, the three-port isolated active bridge DC-DC power converter (101) comprises a control unit (102), a primary side (103), and a secondary side (104).

The primary side comprises a first primary-side port (105), a second primary-side port (106), two primary-side switching elements (107a, 107b), a primary-side converter inductance (108), a primary-side transformer winding (109), and a blocking switch (110). The two primary-side switching elements (107a, 107b) and the primary-side converter inductance (108) are arranged to form a buck converter for converting power between the first primary-side port (105) and the second primary-side port (106). The control unit (102) is configured to control the two primary-side switching elements (107a, 107b) to convert power between the first primary-side port (105) and the second primary-side port (106).

The secondary side (104) comprises a secondary-side port (111), two secondary-side switching elements (112a, 112b), and a secondary-side transformer winding (113), magnetically coupled to the primary-side transformer winding (109). The two primary-side switching elements (107a, 107b), the primary-side transformer winding (109), the two secondary-side switching elements (112a, 112b) and the secondary-side transformer winding (113) are arranged to form an isolated DC-DC converter between the primary-side ports (105, 106) and the secondary-side port (111). The control unit (102) is configured to open the blocking switch (110) to prevent power flow between the primary side (103) and the secondary side (104) and to close the blocking switch (110) to allow power flow between the primary side (103) and the secondary side (104). The control unit (102) is further configured to control the two primary-side switching elements (107a, 107b) and the two secondary-side switching elements (112a, 112b) for converting power between the primary-side ports (105, 106) and the secondary-side port (111).

The blocking switch (110) comprises two blocking switching elements (114a, 114b), the two blocking switching elements (114a, 114b) being connected in anti-series. The two blocking switching elements (114a, 114b) are connected in series to the primary-side transformer winding (109). The blocking switching elements (114a, 114b) are arranged such that they interrupt the power flow between the primary side (103) and the secondary side (104) when opened. When the blocking switching elements (114a, 114b) are opened, the three-port isolated active bridge DC-DC power converter (101) is configured to prevent or minimize a power flow from the first primary-side port (105) to the second primary-side port (106).

The blocking switching elements (114a, 114b) are arranged such that they allow a power flow between the primary side (103) and the secondary side (104) when closed. When the blocking switching elements (114a, 114b) are closed, the three-port isolated active bridge DC-DC power converter (101) is configured to enable a power flow from the first primary-side port (105) to the secondary-side port (111). Further, when the blocking switching elements (114a, 114b) are closed, the three-port isolated active bridge DC-DC power converter (101) is configured to enable a power flow from the secondary-side port (111) to the second primary-side port (106). Further, when the blocking switching elements (114a, 114b) are closed, the three-port isolated active bridge DC-DC power converter (101) is configured to enable a power flow from the second primary-side port (106) to the secondary-side port (111). Further, when the blocking switching elements (114a, 114b) are closed, the three-port isolated active bridge DC-DC power converter (101) is configured to enable a power flow from the second primary-side port (106) and the first primary-side port (105) to the secondary-side port (111). Further, when the blocking switching elements (114a, 114b) are closed, the three-port isolated active bridge DC-DC power converter (101) is configured to enable a power flow from the secondary-side port (111) and the first primary-side port (105) to the second primary-side port (106). Further, when the blocking switching elements (114a, 114b) are closed, the three-port isolated active bridge DC-DC power converter (101) is configured to enable a power flow from the first primary-side port (105) to the second primary-side port (106) and the secondary-side port (111). Further, the three-port isolated active bridge DC-DC power converter (101) is configured to enable a power flow from the second primary-side port (106) and/or from the secondary-side port (111) to the first primary-side port (105).

The power flows in the three-port isolated active bridge DC-DC power converter (101) are controlled by the control unit (102) controlling the switching of the primary-side switching elements (107a, 107b) and the secondary-side switching elements (112a, 112b). When power is converted from the first primary-side port (105) to the second primary-side port (106), the three-port isolated active bridge DC-DC power converter (101) acts as a buck converter between the first primary-side port (105) and the second primary-side port (106). Additionally, when power is converted between the primary side (103) and the secondary side (104), the three-port isolated active bridge DC-DC power converter (101) acts as an isolated DC-DC power converter between the primary side (103) and the secondary side (104). Specifically, the three-port isolated active bridge DC-DC power converter (101) is configured to allow bidirectional power flow to and from all its ports, in particular from and to the second primary-side port (106) and from and to the secondary-side port (111) and from and to the first primary-side port (105). To achieve these bidirectional power flows, the control unit 102) is configured to control the primary-side switching elements (107a, 107b) and the secondary-side switching elements (112a, 112b) to generate a phase shift that determines the power transfer between the primary side (103) and the secondary side (104). In particular, a positive phase shift between the primary-side ports (105, 106) and the secondary-side port (111) results in a power flow to the secondary-side port (111). A negative phase shift between the primary-side ports (105, 106) and the secondary-side port (111) results in a power flow to the second primary-side port (106) and/or the first primary-side port (105).

FIG. 2 schematically shows a three-port active bridge DC-DC power converter (101) according to the second embodiment of the first aspect of the invention. Compared to the first embodiment of the first aspect of the invention, which first embodiment is schematically shown in FIG. 1, the primary side (103) comprises two additional primary-side switching elements (107c, 107d). The four primary-side switching elements (107a, 107b, 107c, 107d) are arranged to form a primary-side full bridge. An advantage of arranging the two additional primary-side switching elements (107c, 107d), wherein the four primary-side switching elements (107a, 107b, 107c, 107d) form a primary-side full bridge, is that reactive currents can be minimized using the phase shift between the four primary-side switching elements (107a, 107b, 107c, 107d) and the two secondary-side switching elements (112a, 112b). A further advantage is that the full input voltage, i.e., the voltage supplied through the first primary-side port (105) and/or the second primary-side port (106), is available at the primary-side winding (109). In the case of a half bridge, half of the input voltage is available.

The power flows in the three-port isolated active bridge DC-DC power converter (101) are controlled by the control unit (102) controlling the switching of the primary-side switching elements (107a, 107b, 107c, 107d) and the secondary-side switching elements (112a, 112b). When power is converted from the first primary-side port (105) to the second primary-side port (106), the three-port isolated active bridge DC-DC power converter (101) acts as a buck converter between the first primary-side port (105) and the second primary-side port (106). Additionally, when power is converted between the primary side (103) and the secondary side (104), the three-port isolated active bridge DC-DC power converter (101) acts as an isolated DC-DC power converter between the primary side (103) and the secondary side (104). Specifically, the three-port isolated active bridge DC-DC power converter (101) is configured to allow bidirectional power flow to and from all its ports, in particular from and to the second primary-side port (106) and the secondary-side port (111). To achieve these bidirectional power flows, the control unit (102) is configured to control the primary-side switching elements (107a, 107b, 107c, 107d) and the secondary-side switching elements (112a, 112b) to generate a phase shift that determines the power transfer between the primary side (103) and the secondary side (104). In particular, a positive phase shift between the primary-side ports (105, 106) and the secondary-side port (111) results in a power flow to the secondary-side port (111). A negative phase shift between the primary-side ports (105, 106) and the secondary-side port (111) results in a power flow to the second primary-side port (106) and/or the first primary-side port (105).

FIG. 3 schematically shows a three-port active bridge DC-DC power converter (101) according to the third embodiment of the first aspect of the invention. Compared to the first embodiment of the first aspect of the invention, which first embodiment is schematically shown in FIG. 1, the secondary side (104) comprises two additional secondary-side switching elements (112c, 112d). The four secondary-side switching elements (112a, 112b, 112c, 112d) are arranged to form a secondary-side full bridge.

An advantage of arranging two additional secondary-side switching elements (112c, 112d), wherein the four secondary-side switching elements (112a, 112b, 112c, 112d) form a secondary-side full bridge, is that reactive currents can be minimized using the phase shift between the four secondary-side switching elements (112a, 112b, 112c, 112d) and the primary-side switching elements (107a, 107b). A further advantage is that the full input voltage, i.e., the voltage supplied to the secondary side (104) through the transformer core, is available at the secondary-side port (111). In the case of a half bridge, half of the input voltage, i.e., half of the voltage supplied to the secondary side (104) through the transformer core, is available.

The power flows in the three-port isolated active bridge DC-DC power converter (101) are controlled by the control unit (102) controlling the switching of the primary-side switching elements (107a, 107b) and the secondary-side switching elements (112a, 112b, 112c, 112d). When power is converted from the first primary-side port (105) to the second primary-side port (106), the three-port isolated active bridge DC-DC power converter (101) acts as a buck converter between the first primary-side port (105) and the second primary-side port (106). Additionally, when power is converted between the primary side (103) and the secondary side (104), the three-port isolated active bridge DC-DC power converter (101) acts as an isolated DC-DC power converter between the primary side (103) and the secondary side (104). Specifically, the three-port isolated active bridge DC-DC power converter (101) is configured to allow bidirectional power flow to and from all its ports, in particular from and to the second primary-side port (106) and the secondary-side port (111). To achieve these bidirectional power flows, the control unit (102) is configured to control the primary-side switching elements (107a, 107b) and the secondary-side switching elements (112a, 112b, 112c, 112d) to generate a phase shift that determines the power transfer between the primary side (103) and the secondary side (104). In particular, a positive phase shift between the primary-side ports (105, 106) and the secondary-side port (111) results in a power flow to the secondary-side port (111). A negative phase shift between the primary-side ports (105, 106) and the secondary-side port (111) results in a power flow to the second primary-side port (106) and/or the first primary-side port (105).

Figure 4:
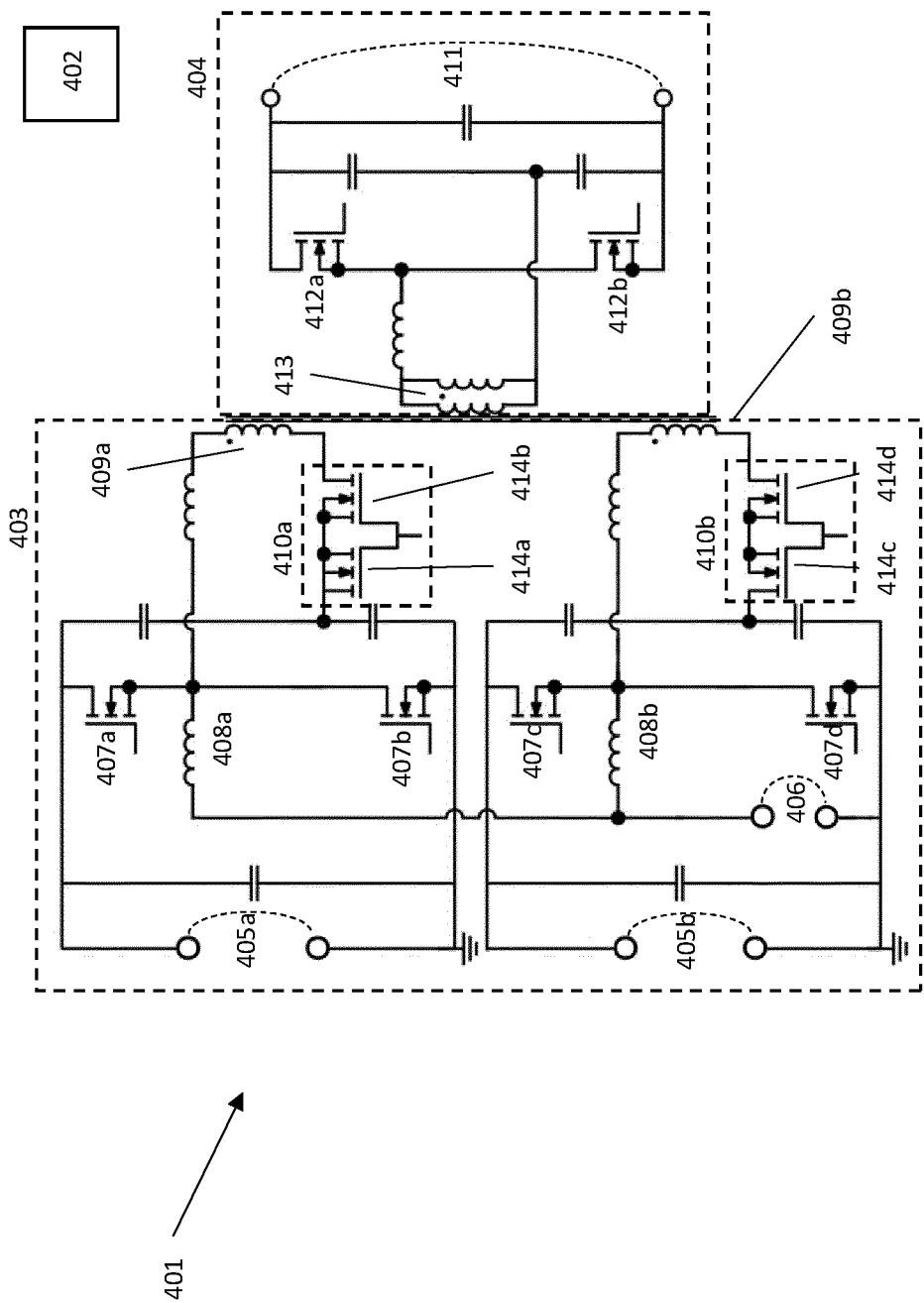
FIG. 4 schematically shows a multi-port isolated active bridge DC-DC power converter according to a first embodiment of the third aspect of the invention.

FIG. 4 schematically shows a multi-port isolated active bridge DC-DC power converter (401) according to a first embodiment of the third aspect of the invention. In the figure, the multi-port isolated active bridge DC-DC power converter (401) comprises a control unit (402), a primary side (403), and a secondary side (404).

The primary side (403) comprises two first primary-side ports (405a, 405b) and a second primary-side port (406). The primary side (403) further comprises four primary-side switching elements (407a, 407b, 407c, 407d) and two primary-side converter inductances (408a, 408b). Two primary-side switching elements (407a, 407b) and a first primary-side converter inductance (408a) are associated with a first first primary-side port (405a) to form a buck converter for converting power between the first first primary-side port (405a) and the second primary-side port (406). The other two primary-side switching elements (407c, 407d) and a second primary-side converter inductance (408b) are associated with a second first primary-side port (405b) to form a buck converter for converting power between the second first primary-side port (405b) and the second primary-side port (406). The control unit (402) is configured to control a first pair of primary-side switching elements (407a, 407b) to convert power between the first first primary-side port (405a) and the second primary-side port (406). The control unit (402) is further configured to control a second pair of primary-side switching elements (407c, 407d) to convert power between the first first primary-side port (405b) and the second primary-side port (406). The primary side (403) further comprises two primary-side transformer windings (409a, 409b), wherein a first primary-side transformer winding (409a) is associated with the first first primary-side port (405a) and a second primary-side transformer windings (409b) is associated with the second first primary-side port (405b).

The secondary side (404) comprises a secondary-side port (411), two secondary-side switching elements (412a, 412b), and a single secondary-side transformer winding (413), magnetically coupled to the primary-side transformer windings (409a, 409b), i.e., to each primary-side transformer winding (409a, 409b). The primary-side switching elements (407a, 407b, 407c, 407d), the primary-side transformer windings (409a, 409b), the two secondary-side switching elements (412a, 412b) and the secondary-side transformer winding (413) are arranged to form an isolated DC-DC converter between the primary-side ports (405a, 405b, 406) and the secondary-side port (411). The control unit is further configured to control the primary-side switching elements (407a, 407b, 407c, 407d) and the two secondary-side switching elements (412a, 412b) for converting power between the primary-side ports (405a, 405b, 406) and the secondary-side port (411).

The primary side (403) further comprises two blocking switches (410*a*, 410*b*), wherein a first blocking switch (410*a*) is associated with the first first primary-side port (405*a*) and a second blocking switch (410*b*) is associated with the second first primary-side port (405*b*). The control unit (402) is further configured to open the blocking switches (410*a*, 410*b*) to prevent power flow between the primary side (403) and the secondary side (404) and to close the blocking switches (410*a*, 410*b*) to allow power flow between the primary side (403) and the secondary side (404). Each blocking switch (410*a*, 410*b*) comprises two blocking switching elements (414*a*, 414*b*, 414*c*, 414*d*). Each pair of blocking switching elements (414*a*, 414*b*, 414*c*, 414*d*) is connected in anti-series. A first pair of blocking switching elements (414*a*, 414*b*) is connected in series to the first primary-side transformer winding (409*a*). A second pair of blocking switching elements (414*c*, 414*d*) is connected in series to the second primary-side transformer winding (409*b*).

The blocking switching elements (414*a*, 414*b*, 414*c*, 414*d*) are arranged such that they interrupt the power flow between the primary side (403) and the secondary side (404) when opened. The blocking switching elements (414*a*, 414*b*, 414*c*, 414*d*) are arranged such that they allow a power flow between the primary side (403) and the secondary side (404) when closed.

When the blocking switching elements (414*a*, 414*b*, 414*c*, 414*d*) are closed, the multi-port isolated active bridge DC-DC power converter (401) is configured to enable a power flow from the first primary-side ports (405*a*, 405*b*) to the secondary-side port (411). Further, when the blocking switching elements (414*a*, 414*b*, 414*c*, 414*d*) are closed, the multi-port isolated active bridge DC-DC power converter (401) is configured to enable a power flow from the secondary-side port (411) to the second primary-side port (406). Further, when the blocking switching elements (414*a*, 414*b*, 414*c*, 414*d*) are closed, the multi-port isolated active bridge DC-DC power converter (401) is configured to enable a power flow from the second primary-side port (406) to the secondary-side port (411). Further, when the blocking switching elements (414*a*, 414*b*, 414*c*, 414*d*) are closed, the multi-port isolated active bridge DC-DC power converter (401) is configured to enable a power flow from the second primary-side port (406) and the first primary-side ports (405*a*, 405*b*) to the secondary-side port (411). Further, when the blocking switching elements (414*a*, 414*b*, 414*c*, 414*d*) are closed, the multi-port isolated active bridge DC-DC power converter (401) is configured to enable a power flow from the secondary-side port (411) and the first primary-side port (405) to the second primary-side port (406). Further, when the blocking switching elements (414*a*, 414*b*, 414*c*, 414*d*) are closed, the multi-port isolated active bridge DC-DC power converter (401) is configured to enable a power flow from the first primary-side ports (405*a*, 405*b*) to the second primary-side port (406) and the secondary-side port (411). Further, the multi-port isolated active bridge DC-DC power converter (401) is configured to enable a power flow from the second primary-side port (406) and/or the secondary-side port (411) to the first primary-side ports (405*a*, 405*b*).

The power flows in the multi-port isolated active bridge DC-DC power converter (401) are controlled by the control unit (402) controlling the switching of the primary-side switching elements (407*a*, 407*b*, 407*c*, 407*d*) and the secondary-side switching elements (412*a*, 412*b*). When power is converted from the first primary-side ports (405*a*, 405*b*) to the second primary-side port (406), the multi-port isolated active bridge DC-DC power converter (401) acts as a buck converter between the first primary-side ports (405*a*, 405*b*) and the second primary-side port (406). Additionally, when power is converted between the primary side (403) and the secondary side (404), the multi-port isolated active bridge DC-DC power converter (401) acts as an isolated DC-DC power converter between the primary side (403) and the secondary side (404). Specifically, the multi-port isolated active bridge DC-DC power converter (401) is configured to allow bidirectional power flow to and from all its ports, in particular from and to the second primary-side port (406) and the secondary-side port (411). To achieve these bidirectional power flows, the control unit (402) is configured to control the primary-side switching elements (407*a*, 407*b*, 407*c*, 407*d*) and the secondary-side switching elements (412*a*, 412*b*) to generate a phase shift that determines the power transfer between the primary side (403) and the secondary side (404). In particular, a positive phase shift between the primary-side ports (405*a*, 405*b*, 406) and the secondary-side port (411) results in a power flow to the secondary-side port (411). A negative phase shift between the primary-side ports (405*a*, 405*b*, 406) secondary-side port (411) results in a power flow to the second primary-side port (406) and/or the first primary-side ports (405*a*, 405*b*).

Figure 5:
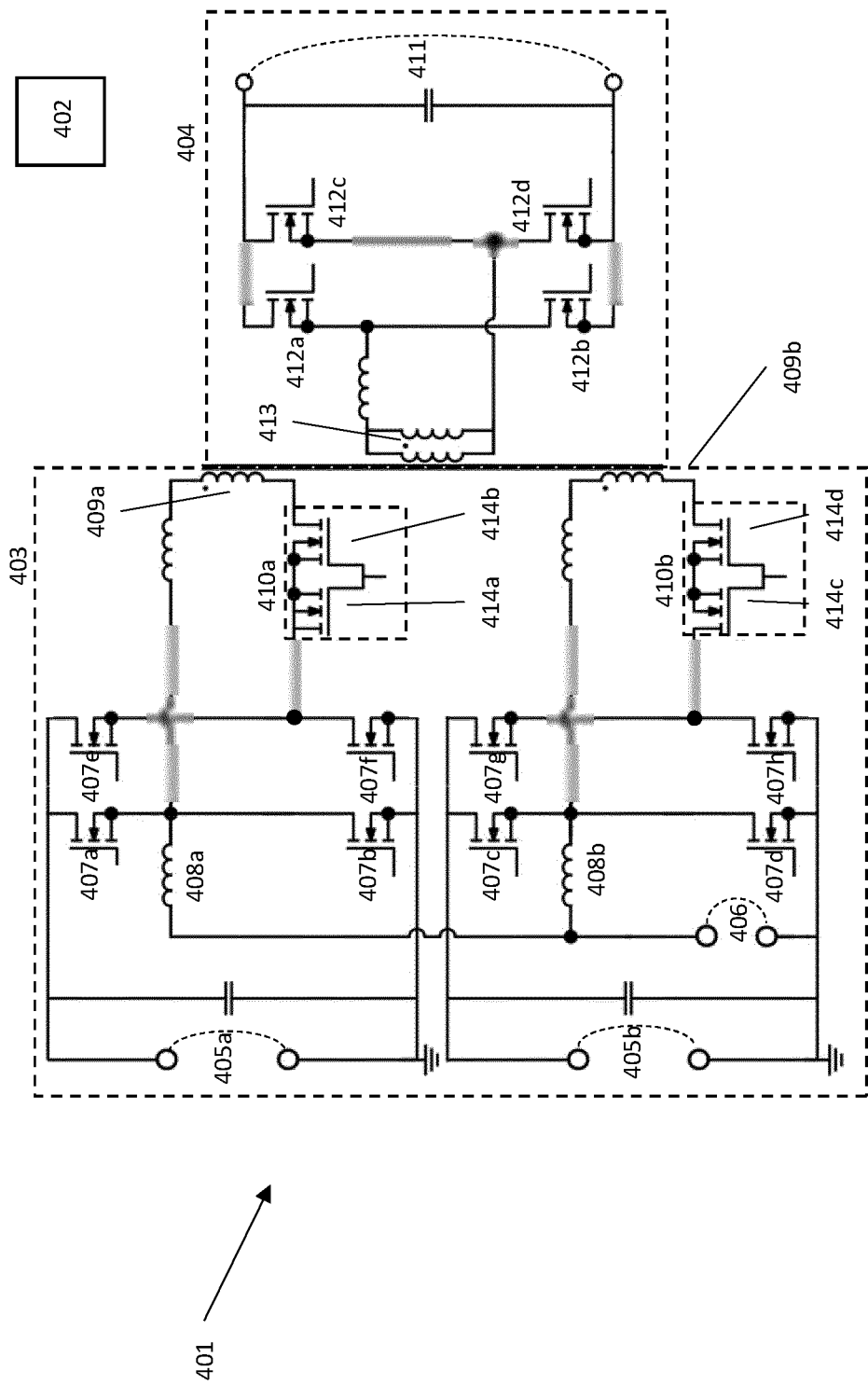
FIG. 5 schematically shows a multi-port isolated active bridge DC-DC power converter according to a second embodiment of the third aspect of the invention.

FIG. 5 schematically shows a multi-port isolated active bridge DC-DC power converter according to a second embodiment of the third aspect of the invention.

Compared to the first embodiment of the third aspect of the invention, which first embodiment is schematically shown in FIG. 4, the primary side (403) comprises four additional primary-side switching elements (407*e*, 407*f*, 407*g*, 407*h*). A first quadruple of primary-side switching elements (407*a*, 407*b*, 407*e*, 407*f*) are arranged to form a first primary-side full bridge, associated with the first first primary-side port (405*a*). A second quadruple of primary-side switching elements (407*c*, 407*d*, 407*g*, 407*h*) are arranged to form a second primary-side full bridge, associated with the second first primary-side port (405*b*). Additionally, the secondary side (404) comprises two additional secondary-side switching elements (412*c*, 412*d*). The four secondary-side switching elements (412*a*, 412*b*, 412*c*, 412*d*) are arranged to form a secondary-side full bridge.

An advantage of forming a primary-side full bridge and a secondary-side full bridge, is that reactive currents can be minimized using the phase shift between the eight primary-side switching elements (407*a*, 407*b*, 407*c*, 407*d*, 407*e*, 407*f*, 407*g*, 407*h*) and the secondary-side switching elements (412*a*, 412*b*, 412*c*, 412*d*). A further advantage is that the full input voltage, i.e., the voltage supplied through the first first primary-side port (405*a*) and the second first primary-side port (405*b*) is available at the first primary-side winding (409*a*) and the second primary-side winding (409*b*), respectively. In the case of a half bridge, half of the input voltage, i.e., half of the voltage supplied through the first primary-side ports (405*a*, 405*b*) is available. A further advantage is that the full voltage supplied to the secondary side (404) through the transformer core, is available at the secondary-side port (411). In the case of a half bridge, half of the voltage supplied to the secondary side (404) through the transformer core is available.

FIG. 6*a* schematically shows a three-port isolated active bridge DC-DC power converter system (601) according to an embodiment of the second aspect of the invention. In the figure, the three-port isolated active bridge DC-DC power converter system (601) comprises four three-port isolated active bridge DC-DC power converters (101*a*, 101*b*, 101*c*, 101*d*) according to the first aspect of the invention, a first system port (602), and a second system port (603); The four three-port isolated active bridge DC-DC power converters (101a, 101b, 101c, 101d) are coupled in series through their secondary-side ports (111a, 111b, 111c, 111d) to form the second system port (603). Additionally, the four three-port isolated active bridge DC-DC power converters (101a, 101b, 101c, 101d) are coupled in parallel through their second primary-side ports (106a, 106b, 106c, 106d) to form the first system port (602).

The three-port isolated active bridge DC-DC power converter system (601) is configured for four power generating units to be connected to its four first primary-side ports (105a, 105b, 105c, 105d). Further, the three-port isolated active bridge DC-DC power converter system (601) comprises a single first system port (602) and a single second system port (603). The first system port (602) is arranged to be connected to a low voltage bus of a vehicle. The second system port (603) is arranged to be connected to a high voltage bus of a vehicle.

FIG. 6b schematically shows a multi-port isolated active bridge DC-DC power converter system (604) according to an embodiment of the fourth aspect of the invention. In the figure, the multi-port isolated active bridge DC-DC power converter system (604) comprises four three-port isolated active bridge DC-DC power converters (401a, 401b, 401c, 401d) according to the third aspect of the invention, a first system port (602), and a second system port (603);

The four multi-port isolated active bridge DC-DC power converters (401a, 401b, 401c, 401d) are coupled in series through their secondary-side ports (411a, 411b, 411c, 411d) to form the second system port (603). Additionally, the four multi-port isolated active bridge DC-DC power converters (401a, 401b, 401c, 401d) are coupled in parallel through their second primary-side ports (406a, 406b, 406c, 406d) to form the first system port (602).

The multi-port isolated active bridge DC-DC power converter system (604) is configured for eight power generating units to be connected to its eight first primary-side ports (405a-405h). Further, the multi-port isolated active bridge DC-DC power converter system (604) comprises a single first system port (602) and a single second system port (603). The first system port (602) is arranged to be connected to a low voltage bus of a vehicle. The second system port (603) is arranged to be connected to a high voltage bus of a vehicle.

Figure 7:
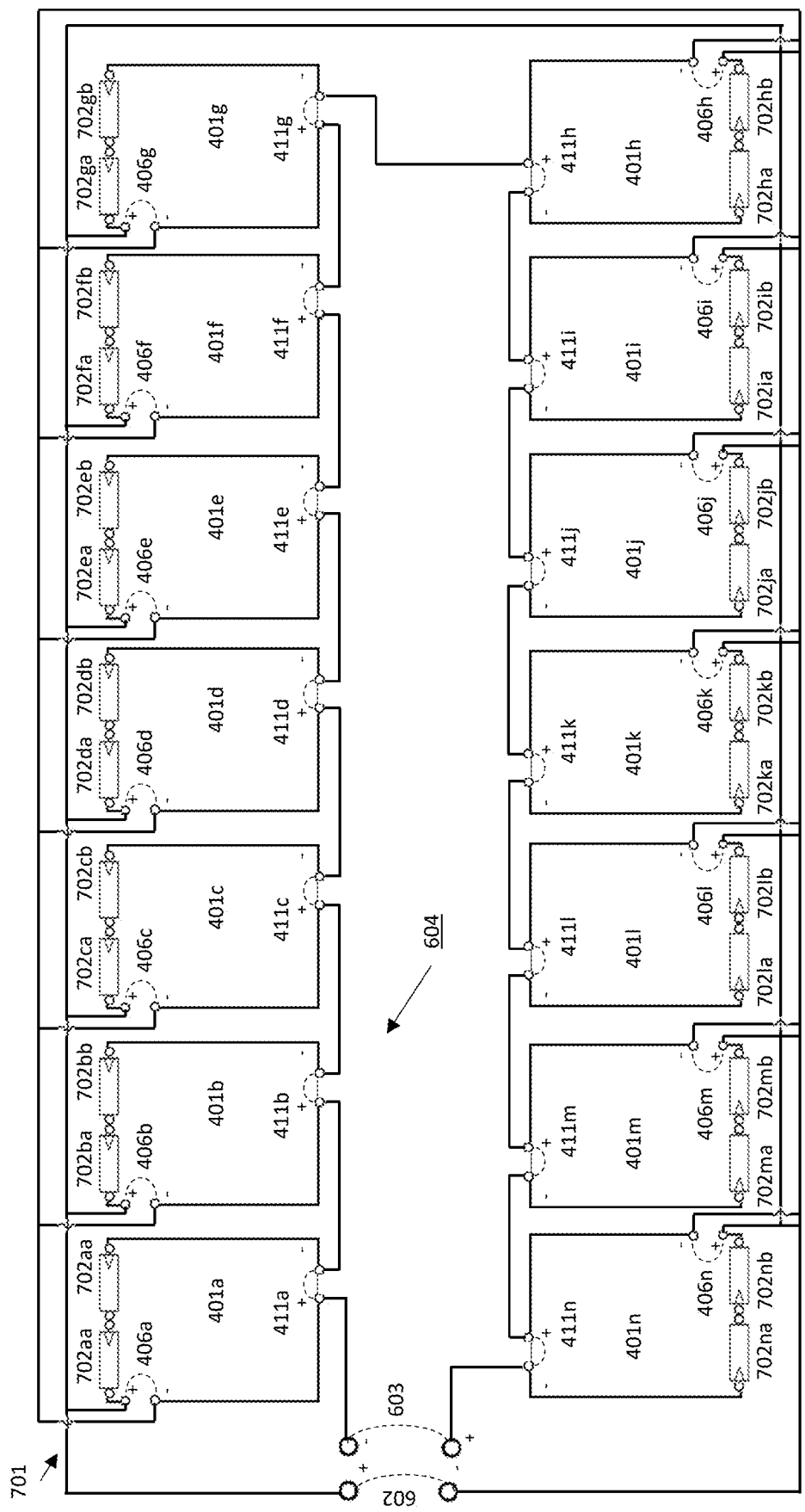
FIG. 7 schematically shows a solar power assembly according to an embodiment of the fifth aspect of the invention.

FIG. 7 schematically shows a solar power assembly (701) according to an embodiment of the fifth aspect of the invention. In the figure, the solar power assembly (701) comprises 28 solar power generating units (702aa-702nb) and a multi-port isolated active bridge DC-DC power converter system (604) according to the fourth aspect of the invention. The 14 multi-port isolated active bridge DC-DC power converters (401a-401n) comprised by the multi-port isolated active bridge DC-DC power converter system (604) are each connected to two solar power generating units (702aa-702nb).

One of the multi-port isolated active bridge DC-DC power converters (401a-401n) comprised by the multi-port isolated active bridge DC-DC power converter system (604) is designated as a master power converter. The control unit of the master power converter is configured to control the output current of the master power converter based on an output current setpoint. For example, the first multi-port isolated active bridge DC-DC power converter (401a) is designated as the master power converter. The remaining multi-port isolated active bridge DC-DC power converters (401b-401n) are designated as slave power converters. The control unit of each of the slave power converters (401b-401n) is configured to control the output voltage of its respective slave power converter (401b-401n) to match the output voltage of the master power converter (401a). Alternatively, the control unit of each of the slave power converters is configured to control the output voltage of its respective slave power converter to be the inverse of the product of the number of multi-port isolated active bridge DC-DC power converters (401a-401n) of the multi-port isolated active bridge DC-DC power converter system (604) and the output voltage of the first system port (602).

The multi-port isolated active bridge DC-DC power converter system (604) comprised by the solar power assembly comprises a single first system port (602) and a single second system port (603). The first system port (602) is arranged to be connected to a low voltage bus of a vehicle. The second system port (603) is arranged to be connected to a high voltage bus of a vehicle.

Figure 8:
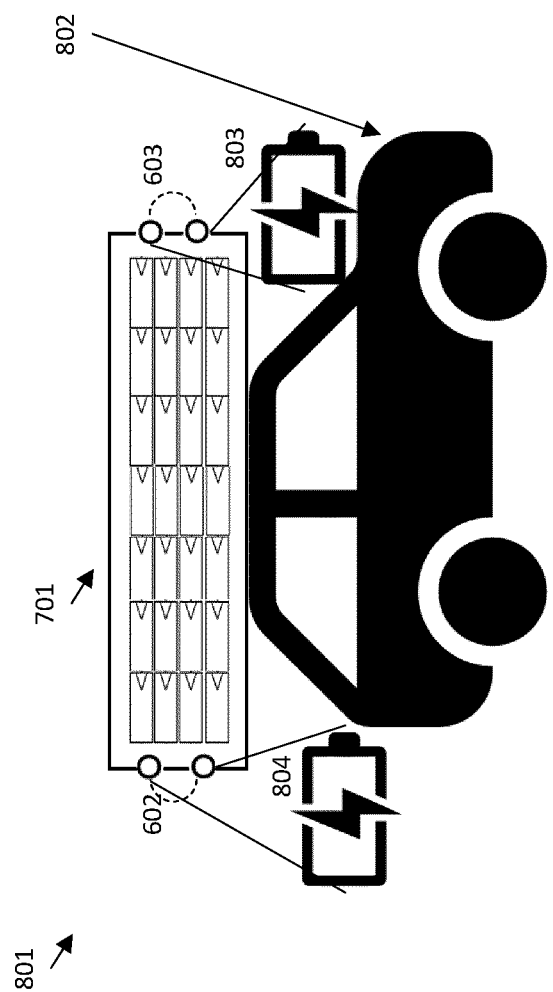
FIG. 8 schematically shows a vehicle according to an embodiment of the sixth aspect of the invention.

FIG. 8 schematically shows a vehicle (801) according to an embodiment of the sixth aspect of the invention. In the figure, the vehicle (801) comprises a body (802), a solar power assembly (701) according to the fifth aspect of the invention, a low voltage battery (803), and a high voltage battery (804).

The solar power generating units (702aa-702nb) of the solar power assembly are mechanically attached to the body (802). The low voltage battery (803) is connected to the first system port (602) of the power converter system (601) of the solar power assembly (701) and the high voltage battery (804) is connected to the second system port (603) of the multi-port isolated active bridge DC-DC power converter system (604) of the solar power assembly (701).

The vehicle comprises a low voltage battery (803), which is connected to a low voltage bus, wherein the low voltage bus powers the low voltage electrical components of the vehicle (801). The vehicle further comprises a high voltage battery (804), which is connected to a high voltage bus, wherein the high voltage bus powers the high voltage electrical components of the vehicle (801). The low voltage battery (803) is electrically connected, through the low voltage bus, to the first system port (602) of the multi-port isolated active bridge DC-DC power converter system (604). This allows power to flow from and to the low voltage battery (803). The high voltage battery (804) is electrically connected, through the high voltage bus, to the second system port (603) of the multi-port isolated active bridge DC-DC power converter system (604). This allows power to flow from and to the high voltage battery (804).

By mechanically attaching the solar power generating units (702aa-702nb) of the solar power assembly (701) to the body (802) of the vehicle (801), the solar power generating units (702aa-702nb) generate power when they are exposed to the sun. The power generated by the solar power generating units (702aa-702nb) flows through a respective first primary-side port (405a-405h) with which each one of the solar power generating units (702aa-702nb) are electrically connected to the multi-port isolated active bridge DC-DC power converter system (604). The multi-port isolated active bridge DC-DC power converter system (604) is configured to convert the power generated by the solar power generating units (702aa-702nb) such that it can be used by the vehicle (801), in particular by its low voltage battery (803) and high voltage battery (804).

The vehicle (801) is for example a commercially available vehicle, for example a vehicle for use on public roads.

The invention according to the present disclosure is also described in the following clauses.

1. A three-port isolated active bridge DC-DC power converter (101), comprising:
   a control unit (102);
   a primary side (103), comprising:
      a first primary-side port (105);
      a second primary-side port (106);
      two primary-side switching elements (107a, 107b);
      a primary-side converter inductance (108);
      the two primary-side switching elements (107a, 107b) and the primary-side converter inductance (108) being arranged to form a half-bridge arrangement for bidirectionally converting power between the first primary-side port (105) and the second primary-side port (106);
      a primary-side transformer winding (109);
   wherein:
      the control unit (102) is configured to control the two primary-side switching elements (107a, 107b) to convert power between the first primary-side port (105) and the second primary-side port (106);
   a secondary side (104), comprising:
      a secondary-side port (111);
      two secondary-side switching elements (112a, 112b);
      a secondary-side transformer winding (113), magnetically coupled to the primary-side transformer winding (109);
      the two primary-side switching elements (107a, 107b), the primary-side transformer winding (109), the two secondary-side switching elements (112a, 112b) and the secondary-side transformer winding (113) being arranged to form an isolated DC-DC converter between the primary side (103) and the secondary side (104);
   a blocking switch (110);
   wherein:
      the control unit (102) is configured to open the blocking switch (110) to prevent power flow between the primary side (103) and the secondary side (104) and to close the blocking switch (110) to allow power flow between the primary side (103) and the secondary side (104); and
      the control unit (102) is configured to control the two primary-side switching elements (107a, 107b) and the two secondary-side switching elements (112a, 112b) for converting power between the primary-side ports (105, 106) and the secondary-side port (111).

2. The three-port isolated active bridge DC-DC power converter (101) according to clause 1, wherein:
   the first primary-side port (105) is an input power port, being arranged to be connected to an input power source;
   the second primary-side port (106) is a low voltage port, being arranged to be connected to a low voltage power storage;
   the secondary-side port (111) is a high voltage port, being arranged to be connected to a high voltage power storage.

3. The three-port isolated active bridge DC-DC power converter (101) according to clause 1 or clause 2, wherein the two primary-side switching elements (107a, 107b) and the primary-side converter inductance (108) are arranged to form a buck converter or a boost converter.

4. The three-port isolated active bridge DC-DC power converter (101) according to any one of clauses 1-3, wherein:
   the primary side (103) comprises the blocking switch (110);

5. The three-port isolated active bridge DC-DC power converter (101) according to clause 4, wherein:
   the blocking switch (110) is connected in series to the primary-side transformer winding (109).

6. The three-port isolated active bridge DC-DC power converter (101) according to any one of clauses 1-3, wherein:
   the secondary side (104) comprises the blocking switch (110);

7. The three-port isolated active bridge DC-DC power converter (101) according to clause 6, wherein:
   the blocking switch (110) is connected in series to the secondary-side transformer winding (113).

8. The three-port isolated active bridge DC-DC power converter (101) according to any one of the preceding clauses, wherein:
   the primary side (103) comprises two additional primary-side switching elements (107c, 107d);
   the four primary-side switching elements (107a, 107b, 107c, 107d) being arranged to form a primary-side full bridge.

9. The three-port isolated active bridge DC-DC power converter (101) according to any one of the preceding clauses, wherein:
   the secondary side (104) comprises two additional secondary-side switching elements (112c, 112d);
   the four secondary-side switching elements (112a, 112b, 112c, 112d) being arranged to form a secondary-side full bridge.

10. The three-port isolated active bridge DC-DC power converter (101) according to any one of the preceding clauses, wherein:
    the blocking switch (110) comprises two blocking switching elements (114a, 114b), the two blocking switching elements (114a, 114b) being connected in anti-series.

11. The three-port isolated active bridge DC-DC power converter (101) according to any one of the preceding clauses, wherein:
    the control unit (102) is configured to control the primary-side switching elements (107a, 107b, 107c, 107d) and the secondary-side switching elements (112a, 112b, 112c, 112d) to generate a phase shift that determines the power transfer between the primary side (103) and the secondary side (104).

12. The three-port isolated active bridge DC-DC power converter (101) according to any one of the preceding clauses, wherein:
    the three-port isolated active bridge DC-DC power converter (101) is configured to enable a power flow from a first power port to a second power port, wherein:
    the first power port is one of the first primary-side port (105), the second primary-side port (106), and the secondary-side port (111);
    the second power port is one of the first primary side-port (105), the second primary-side port (106), and the secondary-side port (111);
    the first power port and the second power port are different.

13. The three-port isolated active bridge DC-DC power converter (101) according to any one of the preceding clauses, wherein:
   the three-port isolated active bridge DC-DC power converter (101) is configured to enable a power flow from a first power port and a second power port to a third power port, wherein:
      the first power port is one of the first primary-side port (105), the second primary-side port (106), and the secondary-side port (111);
      the second power port is one of the first primary side-port (105), the second primary-side port (106), and the secondary-side port (111);
      the third power port is one of the first primary side-port (105), the second primary-side port (106), and the secondary-side port (111);
      the first power port and the second power port and the third power port are different.

14. The three-port isolated active bridge DC-DC power converter (101) according to any one of the preceding clauses, wherein:
   the three-port isolated active bridge DC-DC power converter (101) is configured to enable a power flow from a first power port to a second power port and a third power port, wherein:
      the first power port is one of the first primary-side port (105), the second primary-side port (106), and the secondary-side port (111);
      the second power port is one of the first primary side-port (105), the second primary-side port (106), and the secondary-side port (111);
      the third power port is one of the first primary side-port (105), the second primary-side port (106), and the secondary-side port (111);
      the first power port and the second power port and the third power port are different.

15. A three-port isolated active bridge DC-DC power converter system (601), comprising:
   a plurality of three-port isolated active bridge DC-DC power converters (101a-101n) according to any one of the preceding clauses;
   a first system port (602);
   a second system port (603);
   wherein:
   the plurality of three-port isolated active bridge DC-DC power converters (101a-101n) are coupled in parallel through their second primary-side ports (106a-106n) to form the first system port (602);
   the plurality of three-port isolated active bridge DC-DC power converters (101a-101n) are coupled in series through their secondary-side ports (111a-111n) to form the second system port (603).

16. The three-port isolated active bridge DC-DC power converter system (601) according to clause 15, wherein:
   the first system port (602) is a low voltage port, being arranged to be connected to a low voltage power storage;
   the second system port (603) is a high voltage port, being arranged to be connected to a high voltage power storage.

17. The three-port isolated active bridge DC-DC power converter system (601) according to clause 15 or clause 16, wherein:
   one of the three-port isolated active bridge DC-DC power converters (101a-101n) is designated as a master power converter, wherein the control unit (102) of the master power converter is configured to control the output current of the master power converter based on an output current setpoint;
   the remaining three-port isolated active bridge DC-DC power converters (101a-101n) are designated as slave power converters, wherein the control unit (102) of each of the slave power converters is configured to control the output voltage of its respective slave power converter to match the output voltage of the master power converter or wherein the control unit (102) of each of the slave power converters is configured to control the output voltage of its respective slave power converter to be the inverse of the product of the number of three-port isolated active bridge DC-DC power converters (101a-101n) of the three-port isolated active bridge DC-DC power converter system (601) and the output voltage of the second system port.

18. A multi-port isolated active bridge DC-DC power converter (401), comprising:
   a control unit (402);
   a primary side (403), comprising:
      a plurality of first primary-side ports (405a, 405b);
      a second primary-side port (406);
      two primary-side switching elements (407a, 407b, 407c, 407d) for each first primary-side port (405a, 405b);
      a primary-side converter inductance (408a, 408b) for each first primary-side port (405a, 405b);
      each pair of primary-side switching elements (407a, 407b, 407c, 407d) and a respective primary-side converter inductance (408a, 408b) being arranged to form a half-bridge arrangement for bidirectionally converting power between a respective first primary-side port (405a, 405b) and the second primary-side port (406);
      a primary-side transformer winding (409a, 409b) for each first primary-side port (405a, 405b);
   wherein:
      the control unit (402) is configured to control each pair of primary-side switching elements (407a, 407b, 407c, 407d) to convert power between a respective first primary-side port (405a, 405b) and the second primary-side port (406);
   a secondary side (404), comprising:
      a secondary-side port (411);
      two secondary-side switching elements (412a, 412b);
      a secondary-side transformer winding (413), magnetically coupled to each primary-side transformer winding (409a, 409b);
      the primary-side switching elements (407a, 407b, 407c, 407d), the primary-side transformer windings (109a, 109b), the two secondary-side switching elements (412a, 412b) and the secondary-side transformer winding (413) being arranged to form an isolated DC-DC converter between the primary side (403) and the secondary side (404);
   wherein:
      the control unit is configured to control the primary-side switching elements (407a, 407b, 407c, 407d) and the two secondary-side switching elements (412a, 412b) for converting power between the primary-side ports (405a, 405b, 406) and the secondary-side port (411).

19. The multi-port isolated active bridge DC-DC power converter (401) according to clause 18, wherein:
  each first primary-side port (405) is an input power port, being arranged to be connected to an input power source;
  the second primary-side port (406) is a low voltage port, being arranged to be connected to a low voltage power storage;
  the secondary-side port (411) is a high voltage port, being arranged to be connected to a high voltage power storage.

20. The multi-port isolated active bridge DC-DC power converter (401) according to clause 18 or clause 19, wherein each pair of primary-side switching elements (407a, 407b, 407c, 407d) and the respective primary-side converter inductance (408a, 408b) are arranged to form a buck converter or a boost converter.

21. The multi-port isolated active bridge DC-DC power converter (401) according to any one of clauses 18-20, wherein:
  the primary side (403) comprises two additional primary-side switching elements (407e, 407f, 407g, 407h) for each first primary-side port (405a, 405b);
  each quadruple of primary-side switching elements (407a, 407b, 407c, 407d, 407e, 407f, 407g, 407h) being arranged to form a primary-side full bridge for each first primary-side port (405a, 405b).

22. The multi-port isolated active bridge DC-DC power converter (401) according to clause any one of clauses 18-21, wherein:
  the secondary side (404) comprises two additional secondary-side switching elements (412c, 412d);
  the four secondary-side switching elements (412a, 412b, 412c, 412d) being arranged to form a secondary-side full bridge.

23. The multi-port isolated active bridge DC-DC power converter (401) according to any one of clauses 18-22, wherein:
  the multi-port isolated active bridge DC-DC power converter (401) further comprises a blocking switch (410a, 410b) for each first primary-side port (405a, 405b);
  the control unit (402) is configured to open the blocking switches (410a, 410b) to prevent power flow between the primary side (403) and the secondary side (404) and to close the blocking switches (410a, 410b) to allow power flow between the primary side (403) and the secondary side (404).

24. The multi-port isolated active bridge DC-DC power converter (401) according to clause 23, wherein:
  the primary side (403) comprises the blocking switches (410a, 410b).

25. The multi-port isolated active bridge DC-DC power converter (401) according to clause 24, wherein:
  each blocking switch (410a, 410b) is connected in series to a respective primary-side transformer winding (409a, 409b).

26. The multi-port isolated active bridge DC-DC power converter (401) according to any one of clauses 18-22, wherein:
  the secondary side (403) further comprises a blocking switch (410a, 410b);
  the control unit (402) is configured to open the blocking switch (410a, 410b) to prevent power flow between the primary side (403) and the secondary side (404) and to close the blocking switch (410a, 410b) to allow power flow between the primary side (403) and the secondary side (404).

27. The multi-port isolated active bridge DC-DC power converter (401) according to clause 26, wherein:
  the blocking switch (410a, 410b) is connected in series to the secondary-side transformer winding (413).

28. The multi-port isolated active bridge DC-DC power converter (401) according to any one of clauses 23-27, wherein:
  each blocking switch (410a, 410b) comprises two blocking switching elements (414a, 414b, 414c, 414d), each pair of blocking switching elements (414a, 414b, 414c, 414d) being connected in anti-series.

29. The multi-port isolated active bridge DC-DC power converter (401) according to any one of clauses 18-28, wherein:
  the control unit is configured to control the primary-side switching elements (407a, 407b, 407c, 407d, 407e, 407f, 407g, 407h) and the secondary-side switching elements (412a, 412b, 412c, 412d) to generate a phase shift that determines the power transfer between the primary side (403) and the secondary side (404).

30. The multi-port isolated active bridge DC-DC power converter (401) according to any one of clauses 18-29, wherein:
  the multi-port isolated active bridge DC-DC power converter (401) is configured to enable a power flow from a first power port to a second power port, wherein:
   the first power port is one of the second primary-side port (406) and the secondary-side port (411);
   the second power port is one of the second primary-side port (406) and the secondary-side port (411);
   the first power port and the second power port are different.

31. The multi-port isolated active bridge DC-DC power converter (401) according to any one of clauses 18-30, wherein:
  the multi-port isolated active bridge DC-DC power converter (401) is configured to enable a power flow from each of the first primary-side power ports (405a, 405b) to a first power port, wherein:
   the first power port is one of the second primary-side port (406) and the secondary-side port (411);

32. The multi-port isolated active bridge DC-DC power converter (401) according to any one of clauses 18-31, wherein:
  the multi-port isolated active bridge DC-DC power converter (401) is configured to enable a power flow from each of the first primary-side power ports (405a, 405b) and a first power port to a second power port, wherein:
   the first power port is one of the second primary-side port (406) and the secondary-side port (411);
   the second power port is one of the second primary-side port (406) and the secondary-side port (411);
   the first power port and the second power port are different.

33. The multi-port isolated active bridge DC-DC power converter (401) according to any one of clauses 18-32, wherein:
  the multi-port isolated active bridge DC-DC power converter (401) is configured to enable a power flow from a first power port to each of the first primary-side power ports (405a, 405b), wherein:

the first power port is one of the second primary-side port (406) and the secondary-side port (411);

34. The multi-port isolated active bridge DC-DC power converter (401) according to any one of clauses 18-33, wherein:
the multi-port isolated active bridge DC-DC power converter (401) is configured to enable a power flow from a first power port to each of the first primary-side power ports (405a, 405b) and a second power port, wherein:
the first power port is one of the second primary-side port (406) and the secondary-side port (411);
the second power port is one of the second primary-side port (406) and the secondary-side port (411);
the first power port and the second power port are different.

35. A multi-port isolated active bridge DC-DC power converter system (604), comprising:
a plurality of multi-port isolated active bridge DC-DC power converters (401a-401n) according to any one of clauses 18-34;
a first system port (602);
a second system port (603);
wherein:
the plurality of multi-port isolated active bridge DC-DC power converters (401a-401n) are coupled in parallel through their second primary side ports (406a-406n) to form the first system port (602);
the plurality of multi-port isolated active bridge DC-DC power converters (401a-401n) are coupled in series through their secondary-side ports (411a-411n) to form the second system port (603).

36. The multi-port isolated active bridge DC-DC power converter system (604) according to clause 35, wherein:
the first system port (602) is a low voltage port, being arranged to be connected to a low voltage power storage;
the second system port (603) is a high voltage port, being arranged to be connected to a high voltage power storage;

37. The multi-port isolated active bridge DC-DC power converter system (604) according to clause 35 or clause 36, wherein:
one of the multi-port isolated active bridge DC-DC power converters (401a-401n) is designated as a master power converter, wherein the control unit (402) of the master power converter is configured to control the output current of the master power converter based on an output current setpoint;
the remaining multi-port isolated active bridge DC-DC power converters (401a-401n) are designated as slave power converters, wherein the control unit (402) of each of the slave power converters is configured to control the output voltage of its respective slave power converter to match the output voltage of the master power converter or wherein the control unit (402) of each of the slave power converters is configured to control the output voltage of its respective slave power converter to be the inverse of the product of the number of multi-port isolated active bridge DC-DC power converters (401a-401n) of the multi-port isolated active bridge DC-DC power converter system (604) and the output voltage of the second system port.

38. A solar power assembly (701), comprising:
a plurality of solar power generating units (702aa-702nb);
a power converter system, being either a three-port isolated active bridge DC-DC power converter system (601) according to any one of clauses 15-17 or a multi-port isolated active bridge DC-DC power converter system (604) according to any one of clauses 35-37;
wherein:
each solar power generating unit (702aa-702nb) of the plurality of solar power generating units (702aa-702nb) is connected to a single first primary-side port (105a-d, 405a-h) of the power converter system.

39. A vehicle (801), comprising:
a body (802);
a solar power assembly according to clause 38 (701);
a low voltage battery (803);
a high voltage battery (804);
wherein:
the plurality of solar power generating units (702aa-702nb) of the solar power assembly (701) are mechanically attached to the body (802);
the low voltage battery (803) is connected to the first system port (602) of the power converter system (601) of the solar power assembly (701) and the high voltage battery (804) is connected to the second system port (603) of the power converter system of the solar power assembly (701).

The invention claimed is:

1. A three-port isolated active bridge DC-DC power converter system, comprising:
a plurality of three-port isolated active bridge DC-DC power converters, each comprising:
a control unit;
a primary side, comprising:
a single first primary-side port;
a single second primary-side port;
two primary-side switching elements;
a primary-side converter inductance;
the two primary-side switching elements and the primary-side converter inductance being arranged to form a half-bridge arrangement for bidirectionally converting power between the first primary-side port and the second primary-side port;
a primary-side transformer winding;
wherein:
the control unit is configured to control the two primary-side switching elements to convert power between the first primary-side port and the second primary-side port;
a secondary side, comprising:
a secondary-side port;
two secondary-side switching elements;
a secondary-side transformer winding, magnetically coupled to the primary-side transformer winding;
the two primary-side switching elements, the primary-side transformer winding, the two secondary-side switching elements and the secondary-side transformer winding being arranged to form an isolated DC-DC converter between the primary side and the secondary side;
a blocking switch;
wherein:
the control unit is configured to open the blocking switch to prevent power flow between the primary side and the secondary side and to close the blocking switch to allow power flow between the primary side and the secondary side; and the control unit is configured to control the two primary-side switching elements and the two secondary-side switching elements for converting power between the primary-side ports and the secondary-side port;

a first system port;
a second system port;

wherein:

the plurality of three-port isolated active bridge DC-DC power converters are coupled in parallel through their second primary-side ports to form the first system port;

the plurality of three-port isolated active bridge DC-DC power converters are coupled in series through their secondary-side ports to form the second system port;

one of the three-port isolated active bridge DC-DC power converters is designated as a master power converter, wherein the control unit of the master power converter is configured to control the output current of the master power converter based on an output current setpoint, wherein the output current of the master converter is the output current flowing to the secondary-side port of the master power converter;

the remaining three-port isolated active bridge DC-DC power converters are designated as slave power converters, wherein the control unit of each of the slave power converters is configured to control the output voltage of its respective slave power converter to match the output voltage of the master power converter, wherein the output voltage of each slave power converter is the output voltage of the secondary-side port of the respective slave power converter and the output voltage of the master power converter is the output voltage of the secondary-side port of the master power converter, or wherein the control unit of each of the slave power converters is configured to control the output voltage of its respective slave power converter to be the inverse of the product of the number of three-port isolated active bridge DC-DC power converters of the three-port isolated active bridge DC-DC power converter system and the output voltage of the second system port.

2. The three-port isolated active bridge DC-DC power converter according to claim 1, wherein:

each three-port isolated active bridge DC-DC power converter is configured to enable a power flow from a first power port to a second power port, wherein:

the first power port is one of the first primary-side port, the second primary-side port, and the secondary-side port;

the second power port is one of the first primary side-port, the second primary-side port, and the secondary-side port;

the first power port and the second power port are different; and/or each three-port isolated active bridge DC-DC power converter is configured to enable a power flow from a first power port and a second power port to a third power port, wherein:

the first power port is one of the first primary-side port, the second primary-side port, and the secondary-side port;

the second power port is one of the first primary side-port, the second primary-side port, and the secondary-side port;

the third power port is one of the first primary side-port, the second primary-side port, and the secondary-side port;

the first power port and the second power port and the third power port are different; and/or each three-port isolated active bridge DC-DC power converter is configured to enable a power flow from a first power port to a second power port and a third power port, wherein:

the first power port is one of the first primary-side port, the second primary-side port, and the secondary-side port;

the second power port is one of the first primary side-port, the second primary-side port, and the secondary-side port;

the third power port is one of the first primary side-port, the second primary-side port, and the secondary-side port;

the first power port and the second power port and the third power port are different.

3. The three-port isolated active bridge DC-DC power converter system according to claim 1, wherein:

the first system port is a low voltage port, being arranged to be connected to a low voltage power storage;

the second system port is a high voltage port, being arranged to be connected to a high voltage power storage.

4. A multi-port isolated active bridge DC-DC power converter, comprising:

a control unit;
a primary side, comprising:
  a plurality of first primary-side ports;
  a second primary-side port;
  two primary-side switching elements for each first primary-side port;
  a primary-side converter inductance for each first primary-side port;
  each pair of primary-side switching elements and a respective primary-side converter inductance being arranged to form a half-bridge arrangement for bidirectionally converting power between a respective first primary-side port and the second primary-side port;
  a primary-side transformer winding for each first primary-side port;

wherein:

the control unit is configured to control the primary-side switching elements to convert power between each of the first primary-side ports and the second primary-side port;

a secondary side, comprising:
  a secondary-side port;
  two secondary-side switching elements;
  a single secondary-side transformer winding, magnetically coupled to each primary-side transformer winding;
  the primary-side switching elements, the primary-side transformer windings, the two secondary-side switching elements and the secondary-side transformer winding being arranged to form an isolated DC-DC converter between the primary side and the secondary side;

wherein:
the control unit is configured to control the primary-side switching elements and the two secondary-side switching elements for converting power between each of the primary-side ports and the secondary-side port.

5. The multi-port isolated active bridge DC-DC power converter according to claim 4, wherein each pair of primary-side switching elements and the respective primary-side converter inductance are arranged to form a buck converter or a boost converter.

6. The multi-port isolated active bridge DC-DC power converter according to claim 4, wherein:
the primary side comprises two additional primary-side switching elements for each first primary-side port;
each quadruple of primary-side switching elements being arranged to form a primary-side full bridge for each first primary-side port;
the secondary side comprises two additional secondary-side switching elements;
the four secondary-side switching elements being arranged to form a secondary-side full bridge.

7. The multi-port isolated active bridge DC-DC power converter according to claim 4, wherein:
the multi-port isolated active bridge DC-DC power converter further comprises a blocking switch for each first primary-side port;
the control unit is configured to open the blocking switches to prevent power flow between the primary side and the secondary side and to close the blocking switches to allow power flow between the primary side and the secondary side;
wherein:
the primary side comprises the blocking switches;
each blocking switch is connected in series to a respective primary-side transformer winding.

8. The multi-port isolated active bridge DC-DC power converter according to claim 4, wherein:
the control unit is configured to control the primary-side switching elements and the secondary-side switching elements to generate a phase shift that determines the power transfer between the primary side and the secondary side.

9. The multi-port isolated active bridge DC-DC power converter according to claim 4, wherein:
the multi-port isolated active bridge DC-DC power converter is configured to enable a power flow from a first power port to a second power port, wherein:
the first power port is one of the second primary-side port and the secondary-side port;
the second power port is one of the second primary-side port and the secondary-side port;
the first power port and the second power port are different; and/or
the multi-port isolated active bridge DC-DC power converter is configured to enable a power flow from each of the first primary-side power ports to a first power port, wherein:
the first power port is one of the second primary-side port and the secondary-side port; and/or
the multi-port isolated active bridge DC-DC power converter is configured to enable a power flow from each of the first primary-side power ports and a first power port to a second power port, wherein:
the first power port is one of the second primary-side port and the secondary-side port;
the second power port is one of the second primary-side port and the secondary-side port;
the first power port and the second power port are different; and/or
the multi-port isolated active bridge DC-DC power converter is configured to enable a power flow from a first power port to each of the first primary-side power ports, wherein:
the first power port is one of the second primary-side port and the secondary-side port; and/or
the multi-port isolated active bridge DC-DC power converter is configured to enable a power flow from a first power port to each of the first primary-side power ports and a second power port, wherein:
the first power port is one of the second primary-side port and the secondary-side port;
the second power port is one of the second primary-side port and the secondary-side port;
the first power port and the second power port are different.

10. A multi-port isolated active bridge DC-DC power converter system, comprising:
a plurality of multi-port isolated active bridge DC-DC power converters according to claim 4;
a first system port;
a second system port;
wherein:
the plurality of multi-port isolated active bridge DC-DC power converters are coupled in parallel through their second primary side ports to form the first system port;
the plurality of multi-port isolated active bridge DC-DC power converters are coupled in series through their secondary-side ports to form the second system port.

11. A solar power assembly, comprising:
a plurality of solar power generating units;
a power converter system, being either a three-port isolated active bridge DC-DC power converter system according to claim 1 or a multi-port isolated active bridge DC-DC power converter system according to claim 10;
wherein:
each solar power generating unit of the plurality of solar power generating units is connected to a single first primary-side port of the power converter system.

12. A vehicle, comprising:
a body;
a solar power assembly according to claim 11;
a low voltage battery;
a high voltage battery;
wherein:
the plurality of solar power generating units of the solar power assembly are mechanically attached to the body;
the low voltage battery is connected to the first system port of the power converter system of the solar power assembly and the high voltage battery is connected to the second system port of the power converter system of the solar power assembly.

13. The multi-port isolated active bridge DC-DC power converter system according to claim 10, wherein:
the first system port is a low voltage port, being arranged to be connected to a low voltage power storage;
the second system port is a high voltage port, being arranged to be connected to a high voltage power storage.

14. The multi-port isolated active bridge DC-DC power converter system according to claim 10, wherein:
one of the multi-port isolated active bridge DC-DC power converters is designated as a master power converter, wherein the control unit of the master power converter is configured to control the output current of the master power converter based on an output current setpoint, wherein the output current of the master converter is the output current flowing to the secondary-side port of the master power converter;

the remaining multi-port isolated active bridge DC-DC power converters are designated as slave power converters, wherein the control unit of each of the slave power converters is configured to control the output voltage of its respective slave power converter to match the output voltage of the master power converter, wherein the output voltage of each slave power converter is the output voltage of the secondary-side port of the respective slave power converter and the output voltage of the master power converter is the output voltage of the secondary-side port of the master power converter, or wherein the control unit of each of the slave power converters is configured to control the output voltage of its respective slave power converter to be the inverse of the product of the number of multi-port isolated active bridge DC-DC power converters of the multi-port isolated active bridge DC-DC power converter system and the output voltage of the second system port.

* * * * *